US009932131B2

(12) United States Patent
McVicker et al.

(10) Patent No.: US 9,932,131 B2
(45) Date of Patent: Apr. 3, 2018

(54) POLYSYNCHRONOUS CONSTELLATION DESIGN

(71) Applicant: The Boeing Company, Chicago, IL (US)

(72) Inventors: John M. (Michael) McVicker, Hawthorne, IL (US); Peterson L. Browning, Playa Del Ray, CA (US); Robert A. Hawkins, Hermosa Beach, CA (US); Brendan C. Schmiedekamp, Redondo Beach, CA (US); Robert H. Van Nice, El Segundo, CA (US)

(73) Assignee: The Boeing Company, Chicago, IL (US)

( * ) Notice: Subject to any disclaimer, the term of this patent is extended or adjusted under 35 U.S.C. 154(b) by 99 days.

(21) Appl. No.: 15/046,420

(22) Filed: Feb. 17, 2016

(65) Prior Publication Data
US 2017/0233112 A1    Aug. 17, 2017

(51) Int. Cl.
*B64G 3/00* (2006.01)
*B64G 1/00* (2006.01)

(52) U.S. Cl.
CPC ............... *B64G 3/00* (2013.01); *B64G 1/002* (2013.01)

(58) Field of Classification Search
CPC .................................. B64G 3/00; B64G 1/002
See application file for complete search history.

(56) References Cited

U.S. PATENT DOCUMENTS

| 6,556,808 B1 | 4/2003 | De La Chapelle et al. |
| 7,664,578 B2 | 2/2010 | Fowler et al. |
| 2002/0160710 A1* | 10/2002 | Castiel ............... H04B 7/195 455/12.1 |

OTHER PUBLICATIONS

G. Cai, "Unmanned Rotorcraft Systems", "Chapter 2—Coordinate Systems and Transformations", Jun. 1, 2011, pp. 23-34.
S. Campbell, "Orbital Elements", available via the Internet at satelliteorbitdetermination.com/orbit_elements_wiki.htm (last visited Sep. 15, 2015).
S. Campbell, "Satellite Orbit Determination", available via the Internet at satelliteorbitdetermination.com/ (last visited Sep. 15, 2015).

(Continued)

*Primary Examiner* — Khoi H Tran
*Assistant Examiner* — Robert T Nguyen
(74) *Attorney, Agent, or Firm* — McDonnell Boehnen Hulbert & Berghoff LLP

(57) ABSTRACT

Apparatus and methods for determining orbital parameters for spacecraft are provided. A computing device can receive a first plurality of orbital parameters defining a first orbit by a first spacecraft of a particular object. The first orbit can have a corresponding first ground track over the particular object. The computing device can receive a following time for a second spacecraft. The computing device can determine a second plurality of orbital parameters for a second orbit by the second spacecraft of the particular object based on the first plurality of orbital parameters and the following time. The second orbit can have a corresponding second ground track over the particular object that follows the first ground track. The computing device can generate an output that includes the second plurality of orbital parameters.

20 Claims, 10 Drawing Sheets

(56) References Cited

OTHER PUBLICATIONS

T.S. Kelso, "Orbital Propagation: Part I", May 17, 2014, available via the Internet at celestrak.com/columns/v01n01/ (last visited Nov. 1, 2015).
C. Sabol, "Satellite Formation Flying Design and Evolution", Journal of Spacecraft and Rockets, Mar.-Apr. 2001, pp. 270-278, vol. 38, No. 2.
User29 et al., "How to programmatically calculate orbital elements using position velocity vectors?", Sep. 12, 2013, available via the Internet at space.stackexchange.com/questions/1904/how-to-programmatically-calculate-orbital-elements-using-position-velocity-vectors (last visited Nov. 2, 2015).
Wikimedia Foundation, "Earth-centered inertial", Oct. 29, 2015, available via the Internet at en.wikipedia.org/w/index.php?title=Earth-centered_inertial&oldid=688056345 (last visited Oct. 31, 2015).
Wikimedia Foundation, "Longitude of the ascending node", Dec. 31, 2013, available via the Internet at en.wikipedia.org/w/index.php?title=Longitude_of_the_ascending_node&oldid=588538692 (last visited Sep. 14, 2015).
Wikimedia Foundation, "Mean motion", Sep. 6, 2015, available via the Internet at en.wikipedia.org/w/index.php?title=Mean_motion&oldid=679682132 (last visited Sep. 15, 2015).
Wikimedia Foundation, "Satellite constellation", Feb. 8, 2015, available via the Internet at en.wikipedia.org/w/index.php?title=Satellite_constellation&oldid=646255216 (last visited Sep. 8, 2015).
Wikimedia Foundation, "Standard gravitational parameter", May 24, 2015, available via the Internet at en.wikipedia.org/w/index.php?title=Standard_gravitational_parameter&oldid=663761071 (last visited Sep. 15, 2015).
Wikimedia Foundation, "Zonal spherical harmonics", Aug. 3, 2014, available via the Internet at en.wikipedia.org/w/index.php?title=Zonal_spherical_harmonics&oldid=619679462 (last visited Sep. 14, 2015).

* cited by examiner

POLYSYNCHRONOUS CONSTELLATION DESIGN

BACKGROUND OF THE INVENTION

Unless otherwise indicated herein, the materials described in this section are not prior art to the claims in this application and are not admitted to be prior art by inclusion in this section.

Satellites and other spacecraft have been placed into space for a variety of reasons. Some satellites/spacecraft are used to provide services while orbiting the Earth. Other spacecraft are used to inhabit and/or explore space; e.g., the International Space Station, the New Horizons space probe used to investigate Pluto. In some cases, satellites are deployed in constellations, or groups of satellites working in concert. For example, a constellation of satellites can be launched into orbit around the Earth or another object to carry out a mission, such as providing communications, location, weather, and/or other services.

SUMMARY

In one aspect, a method is provided. A computing device receives a first plurality of orbital parameters defining a first orbit by a first spacecraft of a particular object, where the first orbit has a corresponding first ground track over the particular object. The computing device receives a following time for a second spacecraft. The computing device determines a second plurality of orbital parameters for a second orbit by the second spacecraft of the particular object based on the first plurality of orbital parameters and the following time. The second orbit has a corresponding second ground track over the particular object and the second ground track follows the first ground track. The computing device generates an output that is based on the second plurality of orbital parameters.

In another aspect, a computing device is provided. The computing device includes a processor and data storage. The data storage stores instructions that, upon execution by the processor, cause the computing device to perform functions. The functions include: receiving a first plurality of orbital parameters defining a first orbit by a first spacecraft of a particular object, and where the first orbit has a corresponding first ground track over the particular object; receiving a following time for a second spacecraft; determining a second plurality of orbital parameters for a second orbit by the second spacecraft of the particular object based on the first plurality of orbital parameters and the following time, where the second orbit has a corresponding second ground track over the particular object, and where the second ground track follows the first ground track; and generating an output that is based on the second plurality of orbital parameters.

In another aspect, an article of manufacture is provided. The article of manufacture includes a tangible computer-readable storage medium that stores instructions. The instructions, upon execution by a processor of the article of manufacture, cause the article of manufacture to perform functions. The functions include: receiving a first plurality of orbital parameters defining a first orbit by a first spacecraft of a particular object, and where the first orbit has a corresponding first ground track over the particular object; receiving a following time for a second spacecraft; determining a second plurality of orbital parameters for a second orbit by the second spacecraft of the particular object based on the first plurality of orbital parameters and the following time, where the second orbit has a corresponding second ground track over the particular object, and where the second ground track follows the first ground track; and generating an output is based on the second plurality of orbital parameters.

BRIEF DESCRIPTION OF THE DRAWINGS

Various examples of particular embodiments are described herein with reference to the following drawings, wherein like numerals denote like entities, in which.

DETAILED DESCRIPTION

Figure 1A:
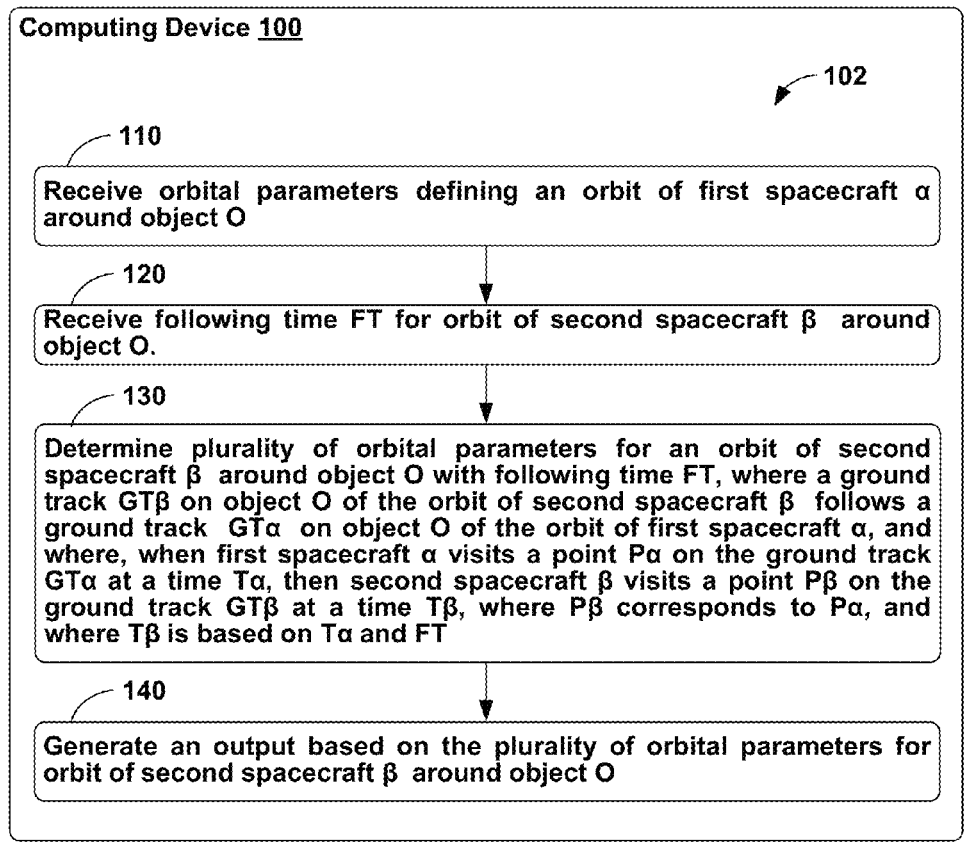
FIG. 1A is a block diagram of a computing device, in accordance with an example embodiment.

Constellations of spacecraft, such as satellites, can provide persistent and resilient global satellite access to terrestrial users of the constellation. When a satellite orbits the Earth (or other object), the satellite traces out a path or "ground track" on the surface of the Earth. A new methodology of constellation design is disclosed herein that can provide persistent, resilient, and global spacecraft access. This novel constellation design methodology can solve many challenges when related to orbital persistence while being independent of a spacecraft's payload.

The methodology involves finding a constellation such that every spacecraft is in a naturally repeating following or leading ground track orbit. Then, the constellation can be designed such that a spacecraft S1 in the constellation can have at least one other spacecraft S2 that follows S1's orbit. Spacecraft pairs, such as S1 and S2, can have one or more portions of coverage which overlap on a continuous basis. For example, the ground tracks of S1 and S2 can be virtually the same, or exactly the same—then, the ground tracks of S1 and S2 can classified as being a (nearly) common ground track. In this example, as S1 and S2 have a (nearly) common ground track, then if spacecraft S1 flies over a point P of the Earth along its ground track at some time T1, then spacecraft S2 can overfly point P at some later time T2. The constellation can be designed such that S2 can have a following orbit with a pre-determined or otherwise known following time FT, FT=T2−T1, after S1 overflies point P. For example, if S1 flies over point P at 0710, and S2 flies over point P at 0720, the following time FT would be 10 minutes, and S2's ground track can be termed as a following ground track. In some cases, S2 can overfly point P before S1, and S2's ground track can be termed as a leading ground track. The constellation design can then involve launching S1 into a naturally repeating ground track orbit, and launching S2 into a following or leading ground track orbit that is based on orbital parameters of S1's orbit and the following time FT. Then, other spacecraft; e.g., S3, S4 . . . , can be launched into their own respective following or leading ground track orbits based on orbital parameters of S1's (or S2's) orbit and their respective following times FT to generate a constellation of satellites that provide persistent coverage over points along their (nearly) common ground track.

This constellation design can, when utilized, provide a polysynchronous constellation of spacecraft; that is, a constellation that has distinct groups of spacecraft within the constellation that have different synchronization patterns. For example, a group of two or more spacecraft within the constellation can have one synchronization pattern; e.g., related pair of orbits or ground tracks, while another group of two or more spacecraft within the constellation can have another synchronization pattern.

Some constellation designs can have large gaps in coverage when a spacecraft is rendered non-mission capable. Other constellation designs may not provide many opportunities for simultaneous coupled operations between satellites/spacecraft (unless the number of vehicles is very large), and often must rely on crossing satellite ground tracks to provide time-sensitive repetitive access. By designing a constellation with multiple spacecraft that share a (nearly) common ground track, the herein-described constellation design methodology minimizes or eliminates these issues— as multiple spacecraft share a ground track, the loss of one, or in some examples, a few spacecraft need not lead to large coverage gaps. That is, the herein-described constellation design is resilient in that there is minimal loss in coverage if one of the spacecraft sharing a ground track is taken out of service due to routine maintenance or through anomalies, solar flares, or other environmental effects. Further, by sharing a common ground track, the herein-described constellation design methodology provides many opportunities for simultaneous coupled operations.

The herein-described constellation design can provide freedom of satellite/spacecraft access from nearly anywhere on the ground, constant situational awareness, and a persistent alternative to mesh networks of spacecraft. The constellation design offers many opportunities to provide persistent access, such as providing communications services; e.g., uncensored internet access to human-rights inhibiting countries. The constellation design can also provide new approaches to scientific missions involving interferometry, topography, bathymetry, or perturbation mapping. Military and commercial applications can include constant coupled operations for providing highly accurate 3D or stereo imaging products and the repeating orbits of pairs (or more) spacecraft can lead to more opportunities to use spacecraft in providing maritime awareness, location monitoring, situational awareness, and other services.

Methods and Apparatus for Polysynchronous Constellations of Spacecraft

FIG. 1A is a block diagram of a computing device 100, in accordance with an example embodiment. Computing device 100 can include one or more processors and data storage, such as discussed below in the context of computing device 320 of FIG. 3B. The data storage can store computer-readable program instructions, such as instructions 326 of computing device 320, that when executed by the processor(s) of computing device 100, can cause computing device 100 to perform functions. These functions include, but are not limited to, the herein-described functions related to method 102 as indicated by FIG. 1A. In some embodiments, computing device 100 can perform at least the herein-described functionality of computing device 100a described below in the context of FIG. 1B, in addition to performing the herein-described functions related to method 150 described in the context of FIG. 1B and/or carry out example algorithm A1 discussed below.

Method 102 can be used to design a polysynchronous constellation of spacecraft, such as, but not limited to, satellites, space probes, and space stations. Method 102 can begin at block 110. At block 110, computing device 100 can receive orbital parameters defining an orbit of a first spacecraft α of an object O. The orbit of the first spacecraft α can have a corresponding first ground track over object O. For example, the first spacecraft α can be a satellite orbiting the Earth, where the Earth is object O, and the ground track of the orbit can trace out a path on the Earth's surface.

In some embodiments, the orbital parameters related to an orbit of first spacecraft α around object O can include six orbital parameters, including: (1) a semi-major axis a of the orbit, (2) an inclination i of the orbit, (3) a right ascension of the ascending node (RAAN) Ω of the orbit, (4) an eccentricity e of the orbit, (5) an argument of perigee w of the orbit, and (6) a mean anomaly M of the orbit. The semi-major axis a can be specified as a distance in kilometers, miles, meters, feet, or other units of distance. Each of the inclination i, RAAN Ω, argument of perigee w, and mean anomaly M can be specified as an angular measure in degrees, radians or other units of angular measure. The eccentricity e can be specified as a unit-less value.

The size and shape of the orbit of first spacecraft α about object O can be described by three of the above-mentioned six orbital parameters: the semi-major axis a of the orbit (orbital parameter (1) above), the eccentricity e of the orbit (orbital parameter (4) above), and a mean anomaly M of the orbit (orbital parameter (6) above). The orbit of first spacecraft α about object O can be can be described by an ellipse having a major, or longer, axis, and a minor, or smaller, axis. In the special case where the major axis is the same size as the minor axis, then the elliptical orbit can be described as a circle.

The semi-major axis, represented using the variable a (and orbital parameter (1) listed above), of the orbit is one-half of the length of the major axis of the orbit, represented using the variable b, and a semi-minor axis is one-half of the length of the minor axis of the orbit. The eccentricity of the orbit, e (and orbital parameter (4) listed above) can then be defined as:

$$e = \sqrt{1 - \frac{b^2}{a^2}}$$

Correspondingly, given the semi-major axis a and the eccentricity e of the orbit, the value of b for the semi-minor axis can be found as:

$$b = a\sqrt{1-e^2}$$

In some examples, such as orbital parameters provided as two-line element sets, a mean motion value can be provided rather than a semi-major axis value. The mean motion value n can measure be a time-average of angular velocity of an orbiting satellite, and can indicate how fast a satellite progresses around its orbit. The mean motion value n can be specified in terms of revolutions per day, revolutions per hour, or in another measure of angular velocity. In the example where object O is the earth, Equation (1) below can be used to determine the semi-major axis value a given the mean motion value n:

$$a \approx \frac{6.6228}{n^{\frac{2}{3}}} \quad (1)$$

For Equation (1), the value of semi-major axis a is specified in terms of Earth radii—the radius of the Earth is approximately 6,371 kilometers. So, of the example where N=2.03, Equation (1) indicates that a will be 4.1308 Earth radii, which is approximately 26,318 kilometers. Thus, Equation (1) (or an equivalent equation for another example object O than the Earth) can be used to determine the semi-major axis value a given the mean motion value n.

The mean anomaly value M for first spacecraft α can give an angular position of first spacecraft α measured from a perigee, or point of closest approach of first spacecraft α to object O, of the orbit of first spacecraft α if the first spacecraft α were moving at uniform speed/velocity in the orbit about object O, where the orbit is described by the received orbital parameters. In other examples, a true anomaly value θ can be provided rather than the mean anomaly value M. The true anomaly θ can give an angular position of first spacecraft α as measured from a perigee, or point of closest approach of first spacecraft α in its orbit about object O. The relationship between the true anomaly θ and the mean anomaly M can determined with respect to an eccentric anomaly value E, where the eccentric anomaly is defined as defines the position of first spacecraft α moving along a Keplerian orbit. The relationship between the true anomaly θ and the eccentric anomaly E can be specified using the following equation:

$$\cos E = \frac{e + \cos\theta}{1 + e\cos\theta}$$

where e is the eccentricity of the orbit of the first spacecraft α and where E is specified in radians. Then, the relationship between the eccentric anomaly E and the mean anomaly M can be specified using the following equation:

$$M = E - e \sin E$$

where e is the eccentricity of the orbit of the first spacecraft α and mean anomaly M is specified in radians; e.g., if an input value of mean anomaly M is specified in degrees, then a value $M_r$ of the mean anomaly specified in radians can be determined as $M_r = (\pi/180)*M$.

The plane of the orbit of first spacecraft α about object O with respect to object O can be described by the remaining three of the above-mentioned six orbital parameters: the inclination i of the orbit (orbital parameter (2) above), the RAAN Ω of the orbit (orbital parameter (3) above), and the argument of perigee w (orbital parameter (5) above) of the orbit. The plane of the orbit can be specified with respect to a reference plane and a direction vector. In the example of the celestial equatorial coordinate system, the reference plane can be the celestial plane (the plane of the Earth's equator), and the direction vector can go from the center of the Earth through a first point of Aries, or vernal equinox point. The first point of Aries/vernal equinox point is a point where the Sun crosses the celestial plane in a northward direction along the ecliptic. Then, positive rotations about the celestial plane can be defined to be counter clockwise when viewed from above the celestial plane.

In the example where object O is the Earth, assuming the orbit of first spacecraft α about object O is not exactly in the celestial plane, the orbit of first spacecraft α can intersect the celestial plane along a line, termed the line of nodes. At one point, or node, along the line of nodes, the orbit of first spacecraft α will go from the southern hemisphere of a celestial sphere whose equatorial plane is the celestial plane to the northern hemisphere of the celestial sphere—this node can be termed the ascending node.

Then, the inclination i (orbital parameter (2) above) of the orbit of first spacecraft α indicates an angle between the celestial plane and an orbital plane defined by the orbit of first spacecraft α as measured at the ascending node. The RAAN Ω of the orbit (orbital parameter (3) above) can specify an angular rotation in a counter-clockwise direction from the direction vector to the ascending node. The argument of perigee w (orbital parameter (5) above) can specify an angular rotation between the ascending node and the perigee of the orbit of first spacecraft α.

At block 120, computing device 100 can receive a following time FT for a second spacecraft β that is to orbit object O. In some embodiments, the techniques of blocks 110 and 120 can be combined; e.g., computing device 100 can receive the orbital parameters defining an orbit of a first spacecraft α of an object O and the following time FT at the same time and/or as part of one logical operation (e.g., the orbital parameters defining an orbit of a first spacecraft α of an object O and the following time FT are all specified as parameters provided via one function call to a software function embodying method 102).

The following time FT can specify an amount of time when first spacecraft α flies over a point P on object O before second spacecraft β flies over the point P on object O. For example, suppose first spacecraft α flies over point P of object O along its ground track at some time T1. Then, second spacecraft β can overfly point P at some later time T2, where T2=T1+FT; or in some embodiments, T2=T1−FT. In some examples, a leading time LT can be utilized. The leading time LT can specify an amount of time when second spacecraft β flies over a point P on object O before first spacecraft α flies over the point P on object O. For example, suppose second spacecraft β flies over point P of object O along its ground track at some time T3. Then, first spacecraft α can overfly point P at some later time T4, where T4=T3+LT.

In some embodiments, the following time FT value can follow a convention that a positive-valued following time (e.g, FT>0) indicates a following time and a negative-valued following time (e.g., FT<0) indicates a leading time. In other embodiments, a leading time LT can be provided instead of, or along with, the following time FT at block 120. In particular of these embodiments, the leading time LT value can follow a convention that a positive-valued leading time (e.g, LT>0) indicates a leading time and a negative-valued following time (e.g., LT<0) indicates a following time.

At block 130, computing device 100 can determine a plurality of orbital parameters for an orbit of second spacecraft β around object O with following time FT, where a ground track GTβ on object O of the orbit of second spacecraft β follows a corresponding ground track GTα on object O of the orbit of first spacecraft α. Also, when first spacecraft α visits a point Pα on the ground track GTα at a time Tα, then second spacecraft β visits a point Pβ on the ground track GTβ at a time Tβ, where Pβ corresponds to Pα, and where Tβ is based on Tα and following time FT, specified at block 120.

The ground track GTβ of second spacecraft β can follow the ground track GTα of first spacecraft α when GTα and GTβ are the same, are within a threshold distance of each other along the ground paths, or otherwise follows GTα. For example, let GTα include a point P1 and GTβ include a point P2 that corresponds to P1; for an example of P2 corresponding to P1, let P2 be the closest point on GTβ to point P1. Then GTα and GTβ can be within a threshold distance D>0 of each other if, for all corresponding points P1 and P2, |P1−P2|<D. Also, GTα and GTβ can be the same if, for all corresponding points P1 and P2, P1=P2; i.e., D=0.

In some examples, determining the plurality of orbital parameters for the orbit of second spacecraft β includes determining the plurality of orbital parameters for the orbit of second spacecraft β so that: when first spacecraft α reaches a particular point P3 on ground track GTα at a first time T1, then the second spacecraft β reaches a particular point P4 on GTβ at a second time T2, where P4 corresponds to P3, then, T2 can be based on T1 and FT; e.g., T2 can be T1+FT, T1−FT, T1+FT+c1, T1−FT−c2, for constant values c1 and c2. Other relationships between T1, T2, and FT are possible as well.

In some embodiments, the orbit of second spacecraft β can be specified using the same six orbital parameters used to specify the orbit of first spacecraft α. That is, the orbit of second spacecraft β can be specified using parameters for: (1) a semi-major axis a of the orbit, (2) an inclination i of the orbit, (3) a right ascension of the ascending node (RAAN) Ω of the orbit, (4) an eccentricity e of the orbit, (5) an argument of perigee w of the orbit, and (6) a mean anomaly M of the orbit. In other embodiments, such as embodiments involving orbital parameters specified in two-line element sets, the orbit of first spacecraft α and/or second spacecraft β can be specified using different, but equivalent, orbital parameters to the above-mentioned six orbital parameters used to specify the orbit of first spacecraft α.

In particular, computing device 100 can determine six orbital parameters used to specify the orbit of second spacecraft β based on the values of the six orbital parameters used to specify the orbit of first spacecraft α and the following time FT. Table 1 below lists the parameters used in Equations (2)-(24) below and example units for these parameters, where the term "NONE" indicates a unit-less value (e.g., an eccentricity value).

TABLE 1

| Parameter | Description | Example Units |
|---|---|---|
| $a_\alpha$ | Semi-major axis for orbit of first spacecraft α | km |
| $i_\alpha$ | Inclination for orbit of first spacecraft α | degrees |
| $\Omega_\alpha$ | RAAN for orbit of first spacecraft α | degrees |
| $e_\alpha$ | Eccentricity of orbit of first spacecraft α | NONE |
| $w_\alpha$ | Argument of perigee of orbit of first spacecraft α | degrees |
| $M_\alpha$ | Mean anomaly of orbit of first spacecraft α | degrees |
| FT | Desired following time for second spacecraft β | seconds |
| $a_\beta$ | Semi-major axis for orbit of second spacecraft β | km |
| $i_\beta$ | Inclination for orbit of second spacecraft β | degrees |
| $\Omega_\beta$ | RAAN for orbit of second spacecraft β | degrees |
| $e_\beta$ | Eccentricity of orbit of second spacecraft β | NONE |
| $w_\beta$ | Argument of perigee of orbit of second spacecraft β | degrees |
| $M_\beta$ | Mean anomaly of orbit of second spacecraft β | degrees |
| $T_\alpha$ | Orbital period for orbit of first spacecraft α | seconds |
| $\mu$ | Earth's standard gravitational parameter | $km^3/seconds^2$ |
| $n_\alpha$ | Mean motion for orbit of first spacecraft α | 1/second |
| $\dot{\Omega}$ | Rate of change for RAAN | degrees/second |
| $R_\oplus$ | Radius of the Earth | km |
| $J_2$ | Earth's second dynamic form factor | NONE |
| $\dot{w}$ | Rate of change for the argument of perigee | degrees/second |
| $\dot{M}$ | Linearized rate of change of the mean anomaly | degrees/second |
| $\dot{M}_0$ | Rate of change of the mean anomaly | degrees/second |
| $\omega_\oplus$ | Rotational spin rate of the Earth | degrees/second |
| $\dot{M}_{0,J2}$ | Rate of change of the mean anomaly for the J2 zonal harmonic | degrees/second |
| $\dot{M}_{0,J3}$ | Rate of change of the mean anomaly for the J3 zonal harmonic | degrees/second |
| $\dot{M}_{0,J4}$ | Rate of change of the mean anomaly for the J4 zonal harmonic | degrees/second |
| $\dot{M}_{0,J5}$ | Rate of change of the mean anomaly for the J5 zonal harmonic | degrees/second |
| $\dot{M}_{0,J6}$ | Rate of change of the mean anomaly for the J6 zonal harmonic | degrees/second |
| $\dot{\Omega}_{J2}$ | Rate of change of the RAAN for the J2 zonal harmonic | degrees/second |
| $\dot{\Omega}_{J3}$ | Rate of change of the RAAN for the J3 zonal harmonic | degrees/second |
| $\dot{\Omega}_{J4}$ | Rate of change of the RAAN for the J4 zonal harmonic | degrees/second |
| $\dot{\Omega}_{J5}$ | Rate of change of the RAAN for the J5 zonal harmonic | degrees/second |
| $\dot{\Omega}_{J6}$ | Rate of change of the RAAN for the J6 zonal harmonic | degrees/second |
| $\dot{w}_{J2}$ | Rate of change of the argument of perigee for the J2 zonal harmonic | degrees/second |
| $\dot{w}_{J3}$ | Rate of change of the argument of perigee for the J3 zonal harmonic | degrees/second |
| $\dot{w}_{J4}$ | Rate of change of the argument of perigee for the J4 zonal harmonic | degrees/second |
| $\dot{w}_{J5}$ | Rate of change of the argument of perigee for the J5 zonal harmonic | degrees/second |
| $\dot{w}_{J6}$ | Rate of change of the argument of perigee for the J6 zonal harmonic | degrees/second |
| X(ECI) | X-axis of an Earth-Centered Inertial (ECI) coordinate frame | NONE |

TABLE 1-continued

| Parameter | Description | Example Units |
|---|---|---|
| Y(ECI) | Y-axis of ECI coordinate frame | NONE |
| Z(ECI) | Z-axis of ECI coordinate frame | NONE |
| X(ECF) | X-axis of an Earth-Centered Fixed (ECF) coordinate frame. | NONE |
| Y(ECF) | Y-axis of ECF coordinate frame | NONE |
| Z(ECF) | Z-axis of ECF coordinate frame | NONE |
| $\vec{R}$ | Position vector in ECI coordinate frame | km |
| R | Magnitude of vector $\vec{R}$ | km |
| $R_x, R_y, R_z$ | Respective x, y, and z components of vector $\vec{R}$ | km |
| $\vec{r}$ | Position vector in ECF coordinate frame | km |
| r | Magnitude of vector $\vec{r}$ | km |
| $r_x, r_y, r_z$ | Respective x, y, and z components of vector $\vec{r}$ | km |
| $\vec{V}$ | Velocity vector in ECI coordinate frame | km/second |
| $\vec{v}$ | Velocity vector in ECF coordinate frame | km/second |
| $\vec{A}$ | Acceleration vector in ECI coordinate frame | km/seconds$^2$ |
| $\vec{A_X}, \vec{A_Y}, \vec{A_Z}$ | Respective acceleration vectors in the X, Y, and Z directions. | km/seconds$^2$ |
| $\vec{A}_{J2}$ | Perturbation of acceleration due to the J2 zonal harmonic | km/seconds$^2$ |
| $\vec{A}_{J3}$ | Perturbation of acceleration due to the J3 zonal harmonic | km/seconds$^2$ |
| $\vec{A}_{J4}$ | Perturbation of acceleration due to the J4 zonal harmonic | km/seconds$^2$ |
| $\vec{A}_{J5}$ | Perturbation of acceleration due to the J5 zonal harmonic | km/seconds$^2$ |
| $\vec{A}_{J6}$ | Perturbation of acceleration due to the J6 zonal harmonic | km/seconds$^2$ |
| $M_{ECI \to ECF}$ | Rotation matrix for ECI to ECF transformation | |
| $M_{ECF \to ECI}$ | Rotation matrix for ECF to ECI transformation | |

In one example, at block 110, the received orbital parameters can include semi-major axis $a_\alpha$, inclination $i_\alpha$, RAAN $\Omega_\alpha$, eccentricity $e_\alpha$, argument of perigee $w_\alpha$, and mean anomaly $M_\alpha$ to describe an orbit of first spacecraft α about the Earth; that is, the Earth is object O in this example. Continuing this example, at block 120, the received following time can be FT, where FT is specified in seconds. In this example, the following time FT value follows the convention that a positive-valued following time (e.g, FT>0) indicates a following time and a negative-valued following time (e.g., FT<0) indicates a leading time. For example, if FT<0, then |FT| can indicate the leading time, where |FT| is the absolute value of FT.

Then, computing device 100 can determine the corresponding orbital parameters semi-major axis $a_\beta$, inclination $i_\beta$, RAAN $\Omega_\beta$, eccentricity $e_\beta$, argument of perigee $w_\beta$, and mean anomaly $M_\beta$ to describe an orbit of second spacecraft β about the Earth using the following procedures involving Equations (2)-(14).

1. Computing device 100 can determine an orbital period $T_\alpha$ for the orbit of first spacecraft α using Equation (2) below:

$$T_\alpha = 2\pi \sqrt{\frac{a_\alpha^3}{\mu}} \quad (2)$$

where μ is the Earth's standard gravitational parameter. Measured in km$^3$/s$^2$, μ is approximately 398,600.4418. The value of μ can differ in examples where object O is not the Earth.

2. Computing device 100 can determine a mean motion $n_\alpha$ for the orbit of first spacecraft α using Equation (3) below:

$$n_\alpha = \frac{180}{\pi} \sqrt{\frac{\mu}{a_\alpha^3}} \quad (3)$$

3. Computing device 100 can use Equation (4) below to determine a linearized rate of change for the RAAN $\dot{\Omega}$ for the orbit of first spacecraft α:

$$\dot{\Omega} = -\frac{3}{2} n_\alpha \left( \frac{R_\oplus}{a_\alpha(1-e_\alpha^2)} \right)^2 J_2 \cos\left(\frac{\pi i_\alpha}{180}\right) \quad (4)$$

where $R_\oplus$ is the radius of the Earth≈6,371 km and $J_2$ is the Earth's second dynamic form factor≈0.0010826269. The values of $R_\oplus$ and $J_2$ can differ in examples where object O is not the Earth. In some cases, a value $p_\alpha$ can be used where $p_\alpha = a_\alpha(1-e_\alpha^2)$.

Equation (4) indicates that determining the rate of change of the RAAN $\dot{\Omega}$ can include at least: determining mean motion $n_\alpha$ for the orbit of first spacecraft α based on the semi-major axis $a_\alpha$ for the orbit of first spacecraft α; e.g, using Equation (3) and determining the rate of change of the RAAN $\dot{\Omega}$ based on the mean motion $n_\alpha$, and the inclination of the first orbit $i_\alpha$.

4. Equation (5) can be used to determine the linearized rate of change for the argument of perigee $\dot{w}$ for the orbit of first spacecraft α:

$$\dot{w} = \frac{3}{4} n_\alpha \left( \frac{R_\oplus}{a_\alpha(1-e_\alpha^2)} \right)^2 J_2 \left[ 4 - 5\sin^2\left(\frac{\pi i_\alpha}{180}\right) \right] \quad (5)$$

5. Equation (6) can be used to determine the linearized rate of change of the mean anomaly $\dot{M}$ for the orbit of first spacecraft α:

$$\dot{M} = -\frac{3}{4}n_\alpha\left(\frac{R_\oplus}{a_\alpha(1-e_\alpha^2)}\right)^2 J_2\sqrt{(1-e_\alpha^2)}\left[3\sin^2\left(\frac{\pi i_\alpha}{180}\right)-2\right] \quad (6)$$

For Keplerian orbits, the rate of change of the mean anomaly is equal to the mean motion. To take into account effects of $J_2$, the Earth's second dynamic form factor, the rate of change of the mean anomaly $\dot{M}_0$ is based on the mean motion $n_\alpha$ and the linearized rate of change of the mean anomaly $\dot{M}$ for the orbit of first spacecraft $\alpha$ as shown in Equation (7) below:

$$\dot{M}_0 = n_\alpha\left(1 + \frac{\dot{M}}{n_\alpha}\right) \quad (7)$$

Computing device 100 can use Equation (8) to determine the rate of change of the mean anomaly $\dot{M}_0$ for the orbit of first spacecraft $\alpha$. Equation (8) below can be derived by expanding Equation (7) with the linearized rate of change of the mean anomaly $\dot{M}$ for the orbit of first spacecraft $\alpha$ of Equation (6) and combining like terms:

$$\dot{M}_0 = n_\alpha\left\{1 + \left[\frac{3}{4}\left(\frac{R_\oplus}{a_\alpha(1-e_\alpha^2)}\right)^2 J_2\sqrt{(1-e_\alpha^2)}\right]\left[2 - 3\sin^2\left(\frac{\pi i_\alpha}{180}\right)\right]\right\} \quad (8)$$

6. Computing device 100 can determine the mean anomaly for the second spacecraft $M_\beta$ using Equation (9) below:

$$M_\beta = M_\alpha - FT^*\dot{M}_0 \quad (9)$$

That is, in determining the orbital parameters for the orbit of second spacecraft $\beta$, computing device 100 can determine the rate of change of the mean anomaly $\dot{M}_0$; e.g., using Equation (8). Then, computing device 100 can use Equation (9) to determine the mean anomaly for second spacecraft $M_\beta$, where Equation (9) indicates that $M_\beta$ can be based on the mean anomaly parameter $M_\alpha$ for first spacecraft $\alpha$, the rate of change of the mean anomaly $\dot{M}_0$, and the following time FT for second spacecraft $\beta$.

7. Computing device 100 can determine the RAAN for the second spacecraft $\Omega_\beta$ using Equation (10) below:

$$(\Omega_\beta = \Omega_\alpha + FT^*(\omega_\oplus - \dot{\Omega}) \quad (10)$$

where $\omega_\oplus$ is the rotational spin rate of the Earth; e.g., $\omega_\oplus \approx 0.004178952$ degrees/second.

That is, in determining the orbital parameters for the orbit of second spacecraft $\beta$, computing device 100 can determine the rate of change for the RAAN $\dot{\Omega}$: e.g., using Equation (4). Then, computing device 100 can use Equation (10) to determine the RAAN for the second spacecraft $\Omega_\beta$, where Equation (10) indicates that $\Omega_\beta$ can be based at least on the RAAN parameter $\Omega_\alpha$, for first spacecraft $\alpha$, the rate of change for the RAAN $\dot{\Omega}$, and the following time FT for second spacecraft $\beta$.

8. Computing device 100 can determine the argument of perigee for the second spacecraft $w_\beta$ using Equation (11) below:

$$w_\beta = w_\alpha + FT^*\dot{w} \quad (11)$$

9. After determining the mean anomaly for the second spacecraft $M_\beta$, the RAAN for the orbit of second spacecraft $\Omega_\beta$, and the argument of perigee for the second spacecraft $w_\beta$ using respective Equations (9), (10), and (11), computing device 100 can determine the remaining three orbital parameters for second spacecraft $\beta$—semi-major axis $a_\beta$, inclination $i_\beta$, and eccentricity $e_\beta$—using respective Equations (12), (13), and (14) below.

$$a_\beta = a_\alpha \quad (12)$$

$$i_\beta = i_\alpha \quad (13)$$

$$e_\beta = e_\alpha \quad (14)$$

That is, Equations (12)-(14) indicates that computing device 100 can determine that the semi-major axis $a_\beta$, inclination $i_\beta$, and eccentricity $e_\beta$ orbital parameter values for the orbit second spacecraft $\beta$ are the same as the corresponding respective semi-major axis $a_\alpha$, inclination $i_\alpha$, eccentricity $e_\alpha$, and argument of perigee $w_\alpha$ orbital parameter values used for the orbit of first spacecraft $\alpha$. In other embodiments, other techniques that Equations (12)-(14) can be used to determine some or all of semi-major axis $a_\beta$, inclination $i_\beta$, and eccentricity $e_\beta$ orbital parameter values based at least on corresponding respective semi-major axis $a_\alpha$, inclination $i_\alpha$, eccentricity $e_\alpha$, and argument of perigee $w_\alpha$ orbital parameter values used for the orbit of first spacecraft $\alpha$.

In other embodiments, other mathematical formulations other than Equations (9)-(14) can be used to determine some or all of mean anomaly $M_\beta$, RAAN $\Omega_\beta$, argument of perigee $w_\beta$, semi-major axis $a_\beta$, inclination $i_\beta$, eccentricity $e_\beta$, and orbital parameter values for second spacecraft $\beta$ based at least on corresponding respective mean anomaly $M_\alpha$, RAAN $\Omega_\alpha$, argument of perigee $w_\alpha$, semi-major axis $a_\alpha$, inclination $i_\alpha$, eccentricity $e_\alpha$, orbital parameter values for the orbit of first spacecraft $\alpha$ and/or based on equivalent values to corresponding respective mean anomaly $M_\alpha$, RAAN $\Omega_\alpha$, argument of perigee $w_\alpha$, semi-major axis $a_\alpha$, inclination $i_\alpha$, eccentricity $e_\alpha$, orbital parameter values for the orbit of first spacecraft $\alpha$.

For example, higher order effects of zonal harmonics can also be considered in designing polysynchronous constellations of spacecraft. In particular, Equations (9), (10), and (11) for the respective mean anomaly for the second spacecraft $M_\beta$, RAAN for the second spacecraft $\Omega_\beta$, and argument of perigee for the second spacecraft $w_\beta$ include respective parameters for the J2 zonal harmonic. Then, Equations (9), (10), and (11) can be modified to account for at least the J2, J3, J4, J5 and J6 zonal harmonics as shown in Equations (15), (16), and (17) respectively.

$$M_\beta = M_\alpha - FT^*(\dot{M}_{0,J2} + \dot{M}_{0,J3} + \dot{M}_{0,J4} + \dot{M}_{0,J5} + \dot{M}_{0,J6}) \quad (15)$$

$$\Omega_\beta = \Omega_\alpha + FT^*(w_\oplus - [\dot{\Omega}_{J2} + \dot{\Omega}_{J3} + \dot{\Omega}_{J4} + \dot{\Omega}_{J5} + \dot{\Omega}_{J6}]) \quad (16)$$

$$w_\beta = w_\alpha + FT^*(\dot{w}_{J2} + \dot{w}_{J3} + \dot{w}_{J4} + \dot{w}_{J5} + \dot{w}_{J6}) \quad (17)$$

Note that the parameter $\dot{M}_0$ in Equation (9) is represented as $\dot{M}_{0,J2}$ in Equation (15), the parameter $\dot{\Omega}$ in Equation (10) is represented as $\dot{\Omega}_{J2}$ in Equation (16), and the parameter $\dot{w}$ in Equation (11) is represented as $\dot{w}_{J2}$ in Equation (17).

The highest order and degree of gravitational forces for object O/the Earth can be accounted for using numerical integration in order to derive the second spacecraft $\beta$ orbit based on the orbit of first spacecraft $\alpha$. In some examples, such as shown below, orbital parameters such as discussed above can be replaced with state vectors, such as position and velocity vectors. The state vectors can be determined with respect to coordinate frames, such as the Earth-Centered Inertial (ECI) and Earth-Centered Fixed (ECF) frames.

Figure 1B:
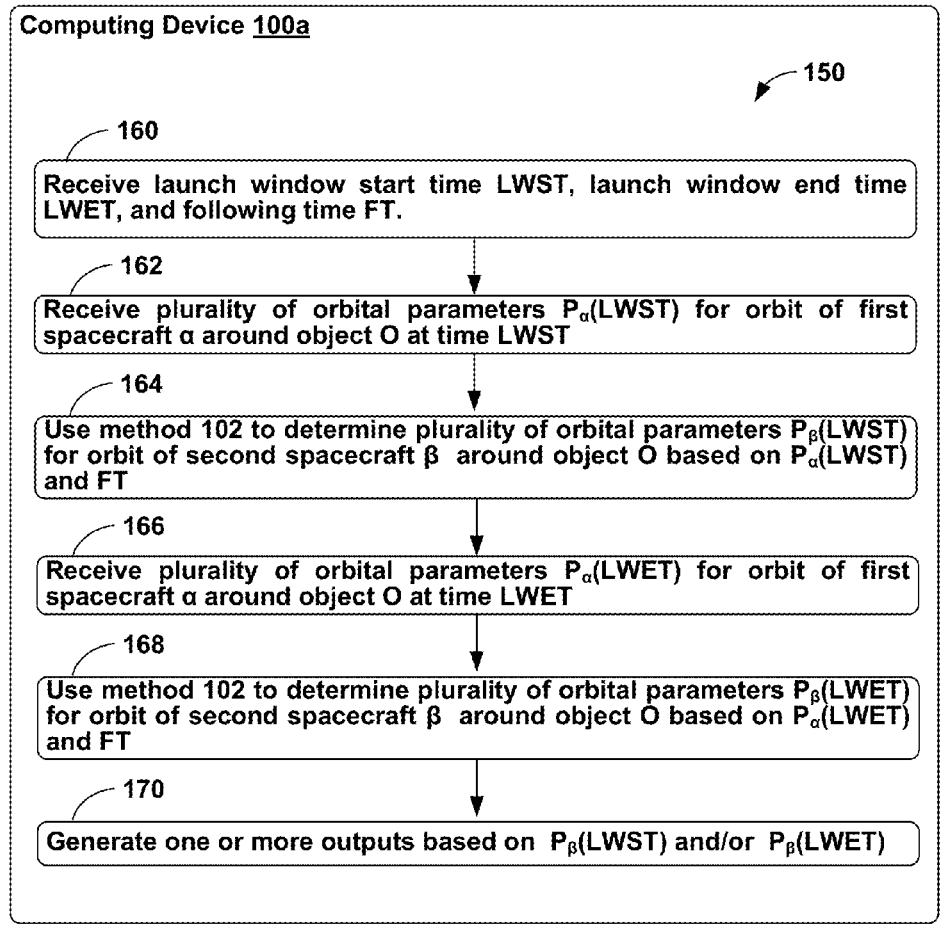
FIG. 1B is a block diagram of another computing device, in accordance with an example embodiment.
Figure 1C:
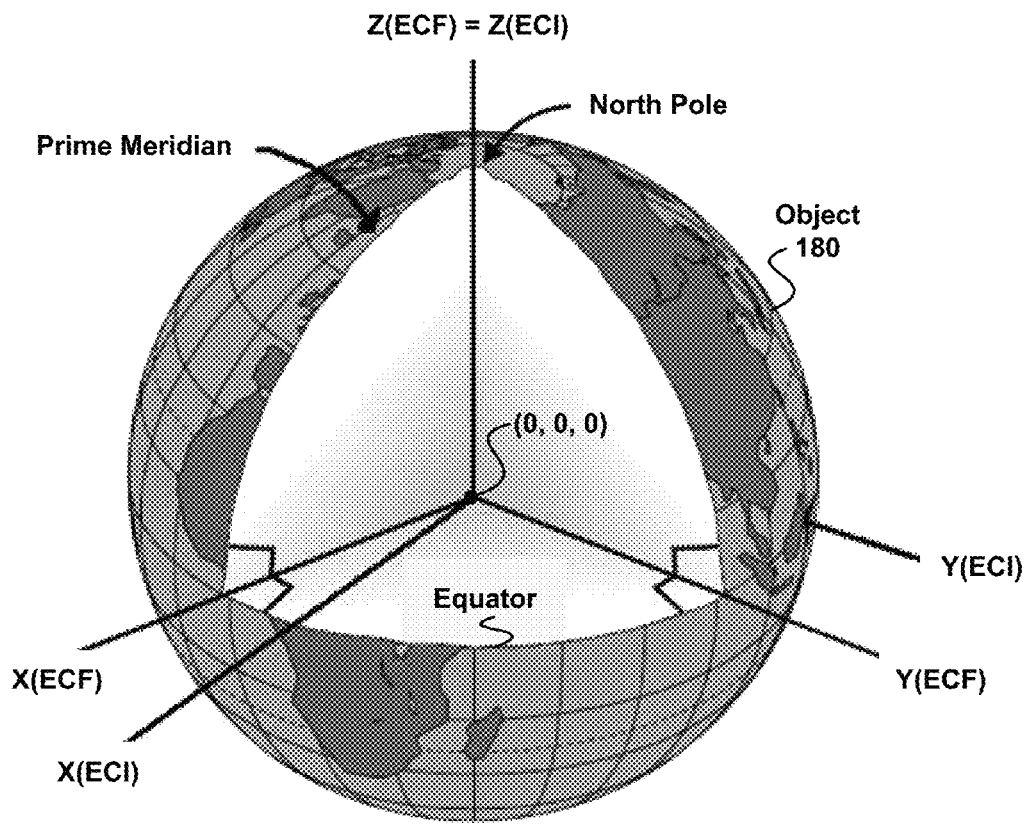
FIG. 1C shows example coordinate frames for an object, in accordance with an example embodiment.

FIG. 1C shows example ECI and ECF coordinate frames shown with respect to an object 180, in accordance with an example embodiment. In the example shown in FIG. 1C, object 180 is the earth, and The axes for the ECI coordinate frame are shown in FIG. 1C as X(ECI), Y(ECI), and Z(ECI) and the axes for the ECF coordinate frame are shown as X(ECF), Y(ECF), and Z(ECF).

Each of the ECI and ECF coordinate frames are based on three respective axes where the zero point (0, 0, 0) for both ECI and ECF coordinate frames is at the center of object 180/the Earth. For both ECI and ECF coordinate frames, each of the respective Z axes, Z(ECI) and Z(ECF), can be a spin axis of object 180/the Earth pointing north through the North Pole, as shown in FIG. 1C.

The X and Y axes of the ECF coordinate frame are fixed with respect to object 180/the Earth, while the X and Y axes of the ECI coordinate frame point in the same direction in inertial space regardless of how object 180/the Earth is rotating. Regarding the ECF coordinate frame, X(ECF) is fixed along the equator and prime meridian; that is, X(ECF) intersects object 180/the Earth at 0° latitude, shown as the Equator in FIG. 1C and 0° longitude, shown as the Prime Meridian in FIG. 1C. Y(ECF) can be determined to be an axis that is orthogonal to both X(ECF) and Z(ECF) based on a right-hand rule, as shown in FIG. 1C.

Regarding the ECI coordinate frame, the X-Y plane of the ECI coordinate frame can coincide with an equatorial plane of object 180/the Earth. X(ECI) can be permanently fixed in a direction relative to the non-rotating celestial sphere. For example, X(ECI) can be part of, all of, or include a line extending from the center of object 180/the Earth that goes through a vernal equinox of the celestial sphere. Y(ECI) can be determined as an axis that is orthogonal to both X(ECI) and Z(ECI) based on a right-hand rule, as shown in FIG. 1C.

In Equations (18)-(24) below, ECI vectors are denoted using $\vec{R}=[R_x\ R_y\ R_z]$ where $R_x$, $R_y$, and $R_z$ are the ECI coordinate values in the respective X(ECI), Y(ECI), and Z(ECI) directions. Then, the value R, the magnitude of the vector $\vec{R}$, can represent the distance from the center of object 180/the Earth in the ECI coordinate frame. The value R can be determined as $R=\|\vec{R}\|=\sqrt{R_x^2+R_y^2+R_z^2}$. Additionally, ECF vectors are denoted as $\vec{r}=[r_x\ r_y\ r_z]$, where $r_x$, $r_y$, and $r_z$ are the ECF coordinate values in the respective X(ECF), Y(ECF), and Z(ECF) directions. Then, the value r, the magnitude of vector $\vec{r}$, can represent the distance from the center of object 180/the Earth in the ECI coordinate frame. The value r can be determined as $r=\|\vec{r}\|=\sqrt{r_x^2+r_y^2+r_z^2}$.

The nominal equation of motion for a perturbed satellite for object 180/the Earth, such as first spacecraft α or second spacecraft β, taking into account at least J2-J6 is shown as Equation (18):

$$\vec{A} = -\frac{\mu}{R^3}\vec{R} + \sum \vec{A}_{perturbations} = \qquad(18)$$
$$-\frac{\mu}{R^3}\vec{R} + \vec{A}_{J2} + \vec{A}_{J3} + \vec{A}_{J4} + \vec{A}_{J5} + \vec{A}_{J6} + \ldots$$

where $\vec{A}$ is a vector acceleration acting on the perturbed satellite. Given the acceleration vector $\vec{A}$, the respective velocity and position of the perturbed satellite can be determined by respectively integrating $\vec{A}$ once and integrating $\vec{A}$ twice. In some embodiments, integrating $\vec{A}$ can be performed using numerical integration, such using Runge-Kutta numerical integration and/or other numerical integration techniques. In other embodiments, one or more of $\vec{A}_{J2}$, $\vec{A}_{J3}$, $\vec{A}_{J4}$, ... can be determined on a component-by-component basis; for example X component $\vec{A}_X$, Y component $\vec{A}_Y$, and/or Z component $\vec{A}_Z$ can be determined for one or more of $\vec{A}_{J2}$, $\vec{A}_{J3}$, $\vec{A}_{J4}$, ... In particular examples, equations for X component $\vec{A}_X$, Y component $\vec{A}_Y$, and Z component $\vec{A}_Z$ can be determined for at least perturbations of acceleration $\vec{A}_{J2}$, $\vec{A}_{J3}$, $\vec{A}_{J4}$, $\vec{A}_{J5}$, and $\vec{A}J_{J6}$.

In some embodiments, an orbit can be propagated. Orbital propagation is a procedure of predicting where an orbiting object, such as a star, planet, moon, spacecraft, or other object, will be along on its orbit. During orbital propagation, position, velocity, and acceleration vectors can be associated with some pre-determined or otherwise known time T. In particular embodiments, vectors expressed in the ECI coordinate frame can be transformed to be expressed in the ECF coordinate frame, or vice versa. For example, position, velocity, and acceleration vectors of an orbit to be propagated can be initially expressed in the ECI coordinate frame; e.g., the respective position vector $\vec{R}$, velocity vector $\vec{V}$, and acceleration vector $\vec{A}$. Then, position vector $\vec{R}$ and velocity vector $\vec{V}$ in the ECI coordinate frame corresponding to time T can be transformed to respective position vector $\vec{r}$ and velocity vector $\vec{v}$ in the ECF coordinate frame at time T using the transformation expressed as Equation (19):

$$T,\vec{R},\vec{V} \rightarrow \vec{r},\vec{v} \qquad(19)$$

The transformation of position vector $\vec{r}$ and velocity vector $\vec{v}$ in the ECF coordinate frame at time T to position vector $\vec{R}$ and velocity vector $\vec{V}$ in the ECI coordinate frame can be expressed as Equation (20):

$$T,\vec{r},\vec{v} \rightarrow \vec{R},\vec{V} \qquad(20)$$

Transforming position vector $\vec{r}$ in the ECF coordinate frame to position vector $\vec{R}$ in the ECI coordinate frame can involve use of a rotation matrix $M_{ECF\rightarrow ECI}$ as indicated in Equation (21):

$$\vec{R} = M_{ECF\rightarrow ECI}\vec{r} \qquad(21)$$

In some embodiments, rotation matrix $M_{ECF\rightarrow ECI}$ can be a 3×3 rotation matrix utilizing Eulerian angles between respective pairs of axes X(ECI) and X(ECF) and Y(ECI) and Y(ECF). Equation (22) can be used to transform position vector $\vec{R}$ in the ECI coordinate frame to position vector $\vec{r}$ in the ECF coordinate frame:

$$\vec{r} = M_{ECI\rightarrow ECF}\vec{R} \qquad(22)$$

In some embodiments, $M_{ECI\rightarrow ECF}$ can be a 3×3 rotation matrix utilizing Eulerian angles between respective pairs of axes X(ECI) and X(ECF) and Y(ECI) and Y(ECF). In still other embodiments, $M_{ECI\rightarrow ECF}$ can be an inverse matrix of $M_{ECF\rightarrow ECI}$; that is, $M_{ECI\rightarrow ECF}=(M_{ECF\rightarrow ECI})^{-1}$, and vice versa, and so $M_{ECI\rightarrow ECF}\ M_{ECF\rightarrow ECI}^{-1}=I$, where I is a 3×3 identity matrix. In even other embodiments, the rotational matrix can be based on a specific date and/or time. In some cases, a position vector in the ECF frame, such as position vector $\vec{r}$, can provide a location on a ground track for an object orbiting object 180/the Earth, such as first spacecraft α or second spacecraft β.

Transforming velocity vector $\vec{v}$ in the ECF coordinate frame to velocity vector $\vec{V}$ in the ECI coordinate frame can involve use of the rotation matrix $M_{ECF\rightarrow ECI}$ in addition to a cross-product term accounting for the Earth's rotational spin rate $\omega_\oplus$, as shown in Equation (23) below $$\vec{V}=M_{ECF\rightarrow ECI}\vec{v}+\omega_\oplus\times\vec{r} \qquad (23)$$

Equation (24) can be used to transform velocity vector $\vec{V}$ in the ECI coordinate frame to $\vec{v}$ in the ECF coordinate frame using the rotation matrix $M_{ECI\rightarrow ECF}$:

$$\vec{v}=M_{ECI\rightarrow ECF}\vec{V}+\omega_\oplus\times\vec{R} \qquad (24)$$

An example algorithm A1 for determining the orbit of second spacecraft β based on state vectors $\vec{R}_\alpha(T)$ and $\vec{V}_\alpha(T)$ in the ECI coordinate frame vectors for first spacecraft α at time T is described below. Algorithm A1 can be executed by a computing device, such as computing device 100, as indicated above. Algorithm A1 can include:

1. Receiving or otherwise determining state vectors $\vec{R}_\alpha(T)$ and $\vec{V}_\alpha(T)$ for first spacecraft α in the ECI coordinate frame at time T.
2. Determining state vectors $\vec{R}_\alpha(T+FT)$ and $\vec{V}_\alpha(T+FT)$ for first spacecraft α at time T+FT by propagating the orbit of first spacecraft α by FT seconds of time.
3. Performing an ECI to ECF coordinate transformation for state vectors $\vec{R}_\alpha(T+FT)$ and $\vec{V}_\alpha(T+FT)$ for first spacecraft α at time T+FT. The ECI to ECF coordinate transformation for state vectors, such as position vector $\vec{R}_\alpha(T+FT)$ and velocity vector $\vec{V}_\alpha(T+FT)$ for first spacecraft α, is discussed above with respect to Equations (19), (22), and (24). The ECI to ECF coordinate transformation can yield state vectors $\vec{r}_\alpha(T+FT)$ and $\vec{v}_\alpha(T+FT)$ in the ECF coordinate frame for first spacecraft α at time T+FT.
4. Initializing state vectors $\vec{r}_\beta(0)$ and $\vec{v}_\beta(0)$ for second spacecraft β in the ECF coordinate frame to respective values of $\vec{r}_\alpha(T+FT)$ and $\vec{v}_\alpha(T+FT)$; that is, initializing $\vec{r}_\beta(0)=\vec{r}_\alpha(T+FT)$ and $\vec{v}_\beta(0)=\vec{v}_\alpha(T+FT)$.
5. Performing a coordinate transformation from ECF to ECI at 0 seconds for the $\vec{r}_\beta(0)$ and $\vec{v}_\beta(0)$ state vectors for second spacecraft β. The ECF to ECI coordinate transformation for state vectors, such as position vector $\vec{r}_\beta(0)$ and velocity vector $\vec{v}_\beta(0)$ for second spacecraft β, is discussed above with respect to Equations (20), (21), and (23). The ECF to ECI coordinate transformation can yield state vectors $\vec{R}_\beta(0)$ and $\vec{V}_\beta(0)$ in the ECI coordinate frame for first spacecraft β at time 0.
6. In some cases, orbital parameter values at time 0 for second spacecraft β, such as mean anomaly $M_\beta$, RAAN $\Omega_\beta$, argument of perigee $w_\beta$, semi-major axis $\alpha_\beta$, inclination $i_\beta$, and eccentricity $e_\beta$ can be determined from state vectors $\vec{R}_\beta(0)$ and $\vec{V}_\beta(0)$ in the ECI coordinate frame using standard techniques for converting between ECI state vectors and corresponding orbital parameters.

For a numerical example of algorithm A1, let the computing device receive or otherwise determine ECF state vectors $\vec{r}_\alpha(T)=[-1210.630, -6770.748, -6770.748]$ and $\vec{v}_\alpha(T)=[4.806806, -0.851452, 5.382659]$ for first spacecraft α at a time T corresponding to Jan. 1, 2015 and with a following time of −600 seconds, or in other words, second spacecraft β can lead first spacecraft α by 600 seconds. In this example, the orbit of second spacecraft β can take into account perturbations for J2, J3, J4, J5, and J6. The ECF state vectors $\vec{r}_\alpha(T)$ and $\vec{v}_\alpha(T)$ indicated for this example can be determined, as indicated in algorithm A1 above by starting with state vectors $\vec{R}_\alpha(T_0)$ and $\vec{V}_\alpha(T_0)$ for first spacecraft α in the ECI coordinate frame at some initial time $T_0$, propagating the orbit of first spacecraft α in time to time T to determine state vectors $\vec{R}_\alpha(T)$ and $\vec{V}_\alpha(T)$ for first spacecraft α at time T, and performing an ECI to ECF conversion of state vectors $\vec{R}_\alpha(T)$ and $\vec{V}_\alpha(T)$ to determine corresponding ECF state vectors $\vec{r}_\alpha(T)$ and $\vec{v}_\alpha(T)$ as shown above.

Table 2 below shows propagation of position vector $\vec{r}_\alpha(T)$ for first spacecraft α at various times, and corresponding propagated position vectors $\vec{r}_\beta(T)$ for second spacecraft β in the ECF coordinate frame.

TABLE 2

| | State vector $\vec{r}_\alpha(T)$ for first spacecraft α | | | State vector $\vec{r}_\beta(T)$ for second spacecraft β | | |
|---|---|---|---|---|---|---|
| Time | X-ECF | Y-ECF | Z-ECF | X-ECF | Y-ECF | Z-ECF |
| 0 s | −1210.630 | −6770.748 | 10.088 | 1740.432* | −5935.150* | 3004.421* |
| 300 s | 270.486 | −6684.711 | 1594.701 | 3066.481** | −4600.505** | 4084.739** |
| 600 s | 1740.432* | −5935.150* | 3004.421* | 4126.920 | −2817.243 | 4717.290 |
| 900 s | 3066.481** | −4600.505** | 4084.739** | 4821.891 | −765.648 | 4832.626 |

Table 2 correctly shows that position vector $\vec{r}_\alpha(600)$ at time T=600 for first spacecraft α, denoted using single stars "*" is identical to position vector $\vec{r}_\beta(0)$ at time T=0 for second spacecraft β, also denoted using single stars. Additionally, Table 2 correctly shows that position vector $\vec{r}_\alpha(900)$ at time T=900 for first spacecraft α, denoted using double stars "**" is identical to position vector $\vec{r}_\beta(300)$ at time T=300 for second spacecraft β, also denoted using double stars. Not shown in Table 2 above are corresponding ECF velocity vectors $\vec{v}_\alpha(T)$ and $\vec{v}_\beta(T)$ at each time, as the velocity vector $\vec{v}_\alpha(600)$ at time T=600 for first spacecraft α would be identical to velocity vector $\vec{v}_\beta(0)$ at time T=0 for second spacecraft β. Also, velocity vector $\vec{v}_\alpha(900)$ at time T=900 for first spacecraft α would be identical to velocity vector $\vec{v}_\beta(300)$ at time T=300 for second spacecraft β.

Table 3 below shows propagation of position vector $\vec{R}_\alpha(T)$ for first spacecraft α at various times, and corresponding propagated position vectors $\vec{R}_\beta(T)$ for second spacecraft β in the ECI coordinate frame.

TABLE 3

| | State vector $\vec{R}_\alpha(T)$ for first spacecraft α | | | State vector $\vec{R}_\beta(T)$ for first spacecraft β | | |
|---|---|---|---|---|---|---|
| Time | X - ECI | Y - ECI | Z - ECI | X - ECI | Y - ECI | Z - ECI |
| 0 s | 6878.137 | 0.000 | 0.000 | 5540.554* | 2757.770* | 2969.432* |
| 300 s | 6501.948 | 1585.328 | 1585.244 | 3910.234** | 3914.492** | 4079.199** |
| 600 s | 5414.629* | 2997.275* | 2969.629* | 1852.456 | 4643.294 | 4717.805 |
| 900 s | 3735.274** | 4081.512** | 4079.464** | −407.850 | 4864.400 | 4833.466 |

The vectors in Table 3 are generated by converting the vectors of Table 2 from the ECF coordinate frame to the ECI coordinate frame. Table 3 shows that vectors that were identical in the ECF coordinate frame are not identical in the ECI coordinate frame. For example, Table 3 shows that ECI position vector $\vec{R}_\alpha(600)$ at time T=600 for first spacecraft α, denoted using single stars is not identical to ECI position vector $\vec{R}_\beta(0)$ at time T=0 for second spacecraft β, also denoted using single stars. However, as indicated above in Table 2, corresponding ECF position vector $\vec{r}_\alpha(600)$ is identical to ECF position vector $\vec{r}_\beta(0)$. As another example, Table 3 shows that ECI position vector $\vec{R}_\alpha(900)$ at time T=900 for first spacecraft α, denoted using double stars is not identical to ECI position vector $\vec{R}_\beta(300)$ at time T=300 for second spacecraft β, also denoted using double stars. However, as indicated above in Table 2, corresponding ECF position vector $\vec{r}_\alpha(600)$ is identical to ECF position vector $\vec{r}_\beta(0)$.

In this example, state vectors at respective times T=600 and T=900 for first spacecraft α should be identical to state vectors at respective times T=0 and T=300 for second spacecraft β. Then, the position and velocity state vectors for second spacecraft β in the ECF coordinate frame can be initialized from corresponding position and velocity state vectors for first spacecraft α in the ECF coordinate frame. In the algorithm A1, particularly Steps 3 and 4, the position and velocity state vectors for second spacecraft β are initialized from state vectors for first spacecraft α in the ECF coordinate frame to ensure that corresponding state vectors are identical.

Algorithm A1 can include J2, J2-J6, or even higher zonal/tesseral harmonic terms. Accounting for higher order zonal/tesseral harmonics can enable the constellation of spacecraft to experience the same perturbations at different times. By experiencing the same perturbations, spacecraft in the constellation can closely follow each other or "walk together", and hence enable better synchronization among spacecraft in the constellation. In some embodiments, drag, solar radiation pressure, n-body effects (i.e. Sun, Moon, Jupiter, etc.), and/or other phenomena can require station keeping to maintain a nominal orbit. Once this nominal orbit is established for first spacecraft α, algorithm A1 can be used and/or modified to initialize second spacecraft β, as well as other spacecraft in the constellation, while also performing station keeping on second spacecraft β to maintain the nominal ground track.

Returning to FIG. 1A, at block 140, computing device 100 can generate an output that is based on the orbital parameters for the orbit of second spacecraft β. In some examples, the output of computing device 100 can include a command to launch the second spacecraft β. In other examples, the output of computing device 100 can include some or all of orbital parameters for the orbit of second spacecraft β. In still other examples, one or more images, sounds, and/or other outputs that are generated based on some or all of the orbital parameters for the orbit of second spacecraft β; e.g., images, sounds, and/or outputs indicating a position, orbit, and/or other information about second spacecraft β. Other example outputs of computing device 100 that are based on orbital parameters for the orbit of second spacecraft β possible as well.

FIG. 1B is a block diagram of computing device 100a, in accordance with an example embodiment. Computing device 100a can include one or more processors and data storage, such as discussed below in the context of computing device 320 of FIG. 3B. The data storage can store computer-readable program instructions, such as instructions 326 of computing device 320, that when executed by the processor(s) of computing device 100a, can cause computing device 100a to perform functions. These functions include, but are not limited to, the herein-described functions related to method 150 as indicated by FIG. 1B. In some embodiments, computing device 100a can perform at least the herein-described functionality of computing device 100 described above in the context of FIG. 1A, in addition to performing the herein-described functions related to method 102 also described above in the context of FIG. 1A, and/or the herein-described functions related to algorithm A1.

Method 150 can be used to design a polysynchronous constellation of spacecraft, such as, but not limited to, satellites, space probes, and space stations. For example, method 150 can be used when the launch of a second spacecraft, such as second spacecraft β, occurs within a launch window between a first launch time and a second launch time, where the second launch time is later than the first launch time. For example, the first launch time can be specified by a parameter provided to computing device 100a, such as parameter LWST (for launch window start time) mentioned below, and the second launch time can be specified by a parameter provided to computing device 100a, such as parameter LWET (for launch window end time) mentioned below.

Then, a plurality of orbital parameters for a second orbit by the second spacecraft of object O can be determined; e.g., the above-mentioned parameters for the orbit of second spacecraft β that include (1) a semi-major axis a of the orbit, (2) an inclination i of the orbit, (3) a right ascension of the ascending node (RAAN) Ω of the orbit, (4) an eccentricity e of the orbit, (5) an argument of perigee w of the orbit, and (6) a mean anomaly M of the orbit.

This plurality of orbital parameters for the second orbit by the second spacecraft can be determined by: determining a first estimate of the second plurality of orbital parameters for the second orbit by the second spacecraft of object O when the second spacecraft is launched at the first launch time, such as specified by parameter LWST; and determining a second estimate of the second plurality of orbital parameters for a second orbit by the second spacecraft of the particular object when the second spacecraft is launched at the second launch time, such as specified by parameter LWET. Then, in this example, the first estimate of the second plurality of orbital parameters can include the plurality of orbital parameters $P_\beta(LWST)$, and the second estimate of the second plurality of orbital parameters can include the plurality of orbital parameters $P_\beta(LWET)$.

Method 150 can begin at block 160, where computing device 100a can receive parameters including launch window start time LWST, launch window start time LWET, and following time FT. These parameters can indicate that second spacecraft β is to be launched sometime during a launch window, or interval of time, starting at launch window start time LWST and launch window start time LWET, and that second spacecraft β is to be launched into an orbit intended to follow an orbit of first spacecraft α by the following time FT.

At block 162, computing device 100a can receive a plurality of orbital parameters $P_\alpha(LWST)$ for an orbit of first spacecraft α around object O at launch window start time LWST. In some embodiments, the plurality of orbital parameters $P_\alpha(LWST)$ can include a semi-major axis $a_\alpha(LWST)$, inclination $i_\alpha(LWST)$, RAAN $\Omega_\alpha(LWST)$, eccentricity $e_\alpha(LWST)$, argument of perigee $w_\alpha(LWST)$, and mean anomaly $M_\alpha(LWST)$ to describe an orbit of first spacecraft α. at launch window start time LWST. In other embodiments, object O can be the Earth.

At block 164, computing device 100a can utilize the above-mentioned techniques of method 102, which are discussed above in the context of FIG. 1A, to determine a plurality of orbital parameters $P_\beta(LWST)$ for an orbit of second spacecraft β around object O at time LWST given the following time FT. For example, $P_\alpha(LWST)$ of method 150 can take the role of the orbital parameters defining an orbit of first spacecraft α around object O in method 102 and following time FT of method 150 can take the role following time FT in method 150. Then, in method 150, the resulting plurality of orbital parameters for the orbit of second spacecraft β around object O determined using method 102 can be termed as $P_\beta(LWST)$.

At block 166, computing device 100a can receive a plurality of orbital parameters $P_\alpha(LWET)$ for an orbit of first spacecraft α around object O at launch window end time LWET. In some embodiments, the plurality of orbital parameters $P_\alpha(LWET)$ can include a semi-major axis $a_\alpha(LWET)$, inclination $i_\alpha(LWET)$, RAAN $\Omega_\alpha(LWET)$, eccentricity $e_\alpha(LWET)$, argument of perigee $w_\alpha(LWET)$, and mean anomaly $M_\alpha(LWET)$ to describe an orbit of first spacecraft α. at time LWET. In other embodiments, object O can be the Earth. In other embodiments, fewer than six orbital parameters can be received as $P_\alpha(LWET)$; for example, if some parameters have the same values at time LWST and time LWET (e.g., such as semi-major axis $a_\alpha$, inclination $i_\alpha$ and/or eccentricity $e_\alpha$) then the parameters that are the same at both times LWST and LWET may not be provided as plurality of orbital parameters $P_\alpha(LWET)$; rather only the parameters whose values change between times LWST and LWET may be provided as plurality of orbital parameters $P_\alpha(LWET)$. In these embodiments, block 166 may include techniques to copy parameters that are the same at both times LWST and LWET from $P_\alpha(LWST)$ to $P_\alpha(LWET)$ to complete the plurality of orbital parameters $P_\alpha(LWET)$.

In still other embodiments, the techniques of blocks 160, 162 and/or 166 can be combined; e.g., computing device 100 can receive LWST, LWET, FT, $P_\alpha(LWST)$, and $P_\alpha(LWET)$ at the same time and/or as part of one logical operation (e.g., some or all of the LWST, LWET, FT, $P_\alpha(LWST)$, and $P_\alpha(LWET)$ parameters are specified using one function call to a software function embodying method 150).

At block 168, computing device 100a can utilize the above-mentioned techniques of method 102 to determine a plurality of orbital parameters $P_\beta(LWET)$ for an orbit of second spacecraft β around object O at time LWET given the following time FT. For example, $P_\alpha(LWET)$ of method 150 can take the role of the orbital parameters defining an orbit of first spacecraft α around object O in method 102 and following time FT of method 150 can take the role following time FT in method 150. Then, in method 150, the resulting plurality of orbital parameters for the orbit of second spacecraft β around object O determined using method 102 can be termed as $P_\beta(LWET)$.

At block 170, computing device 100a can generate one or more outputs based on $P_\beta(LWST)$ and/or $P_\beta(LWET)$. That is computing device 100a can generate one or more outputs of some of all of the values of parameters $P_\beta(LWST)$ and/or $P_\beta(LWET)$, including but not limited to, as alpha-numerical values of some of all of the values of parameters $P_\beta(LWST)$ and/or $P_\beta(LWET)$, create and/or update one or more files and/or other storage resource(s) to include one or more representations some of all of the values of parameters $P_\beta(LWST)$ and/or $P_\beta(LWET)$, invoke software providing some of all of the values of parameters $P_\beta(LWST)$ and/or $P_\beta(LWET)$ as inputs to the invoked software, and/or communicate some of all of the values of parameters $P_\beta(LWST)$ and/or $P_\beta(LWET)$.

In other embodiments, computing device 100a can receive other parameters that specify a launch window other than parameters LWST, LWET, $P_\alpha(LWST)$, and $P_\alpha(LWET)$. For example, more than two times and corresponding parameters can be specified within the launch window. For example, suppose the launch window includes M intervals of time, M>0, starting at times $T_0, T_1, \ldots T_{M-1}$ and ending at times $T_1, T_2, \ldots T_M$; that is, a first interval of the launch window starts at time $T_0$ and ends at time $T_1$, a second interval of the launch window starts at time $T_1$ and ends at time $T_2$, and so on, until reaching an $M^{th}$ interval of the launch window that starts at time $T_M-1$ and ends at time $T_M$. For each interval, a following time FT can be the same.

Then, in these embodiments, computing device 100a can receive M+1 sets of parameters $P_\alpha(T_0)$, $P_\alpha(T_1)$, $P_\alpha(T_2)$, ... $P_\alpha(T_M)$ and the following time FT, where $P_\alpha(T_0)$ is a set of orbital parameters for first spacecraft α at time $T_0$, $P_\alpha(T_1)$ is a set of orbital parameters for first spacecraft α at time $T_1$, $P_\alpha(T_2)$ is a set of orbital parameters for first spacecraft α at time $T_2$, and $P_\alpha(T_M)$ is a set of orbital parameters for first spacecraft α at time $T_M$. Then, computing device 100a can apply the techniques of method 102 as discussed in the context of blocks 164 and 166 above using as inputs the following time FT and each of $P_\alpha(T_0)$, $P_\alpha(T_1)$, $P_\alpha(T_2)$, ... $P_\alpha(T_M)$ to determine corresponding sets of orbital parameters $P_\beta(T_0)$, $P_\beta(T_1)$, $P_\beta(T_2)$, ... $P_\beta(T_M)$ for orbits of second spacecraft β assuming launch times at respective times $T_0$, $T_1$, $T_2$, ... $T_M$.

In other embodiments, the following time can differ for each interval of the launch window; e.g., let $FT_0$ be the following time for second spacecraft β for a launch at time $T_0$, let $FT_1$ be the following time for second spacecraft β for a launch at time $T_1$, let $FT_2$ be the following time for second spacecraft β for a launch at time $T_0$, and so on until reaching $FT_M$, which can be the following time for second spacecraft β for a launch at time $T_M$. Then, computing device 100a can receive M+1 sets of parameters $\{FT_0, P_\alpha(T_0)\}$, $\{FT_1, P_\alpha(T_1)\}$, $\{FT_2, P_\alpha(T_2)\}$, ... $\{FT_M, P_\alpha(T_M)\}$ and can apply the techniques of method 102 as discussed in the context of blocks 164 and 166 above by: receiving as inputs following time $FT_0$ and orbital parameters $P_\alpha(T_0)$ in order to determine corresponding orbital parameters $P_\beta(T_0)$ for an orbit of second spacecraft β launched at time $T_0$ with following time $FT_0$, receiving as inputs following time $FT_1$ and orbital parameters $P_\alpha(T_1)$ in order to determine corresponding orbital parameters $P_\beta(T_1)$ for an orbit of second spacecraft β launched at time $T_1$ with following time $FT_1$, receiving as inputs following time $FT_2$ and orbital parameters $P_\alpha(T_2)$ in order to determine corresponding orbital parameters $P_\beta(T_2)$ for an orbit of second spacecraft β launched at time $T_2$ with following time $FT_2$ and so on, until receiving as inputs following time $FT_M$ and orbital parameters $P_\alpha(T_M)$ in order to determine corresponding orbital parameters $P_\beta(T_M)$ for an orbit of second spacecraft β launched at time $T_M$ with following time $FT_M$.

In still other embodiments, for a launch window of duration M units of time starting at time $T_0$ and ending at time $T_1$, computing device 100a can receive a set of orbital parameters $P_i$ for first spacecraft α and an initial following time $FT_i$. Then, for a specified time $T_{SPEC}$ within the launch window; that is $T_{SPEC}$ in the range $[T_0, T_1]$, the following time FT can be determined based on initial following time $FT_i$ and the specified time $T_{SPEC}$; e.g., $FT=FT_i+c(T_{SPEC}-T_0)$, for constant $c \neq 0$. Then, computing device 100a can apply the techniques of method 102 as discussed in the context of blocks 164 and 166 above by receiving as inputs following time FT and orbital parameters $P_\alpha$ in order to determine corresponding orbital parameters $P_\beta$ for an orbit of second spacecraft β launched at time $T_{SPEC}$ with following time $FT_{SPEC}$. In still other embodiments, combinations of the these techniques discussed in the context of methods 102 and 150 and/or other techniques can be used to determine orbital parameters for an orbit of second spacecraft β being launched at a specified single time (e.g, as discussed in the context of method 102) or at a time within a launch window (e.g. as discussed in the context of method 150).

Spacecraft Launch Scenario

FIGS. 2A-2E depict scenario 200 related to launching a second spacecraft BETA whose ground track over object 180 follows a ground track of object 180 taken by an already-launched first spacecraft ALPHA. In some scenarios, spacecraft ALPHA and BETA can be a pair of spacecraft deployed in a constellation of spacecraft orbiting object 180. In scenario 200, object 180 is the Earth.

In the onset of scenario 200, first spacecraft ALPHA has already been launched and is in orbit around object 180/the Earth and second spacecraft BETA is being prepared for launch. Once second spacecraft BETA is launched, spacecraft ALPHA and BETA will form at least part of a constellation of spacecraft, where BETA will follow ALPHA in orbit around object 180/the Earth.

Figure 2A:
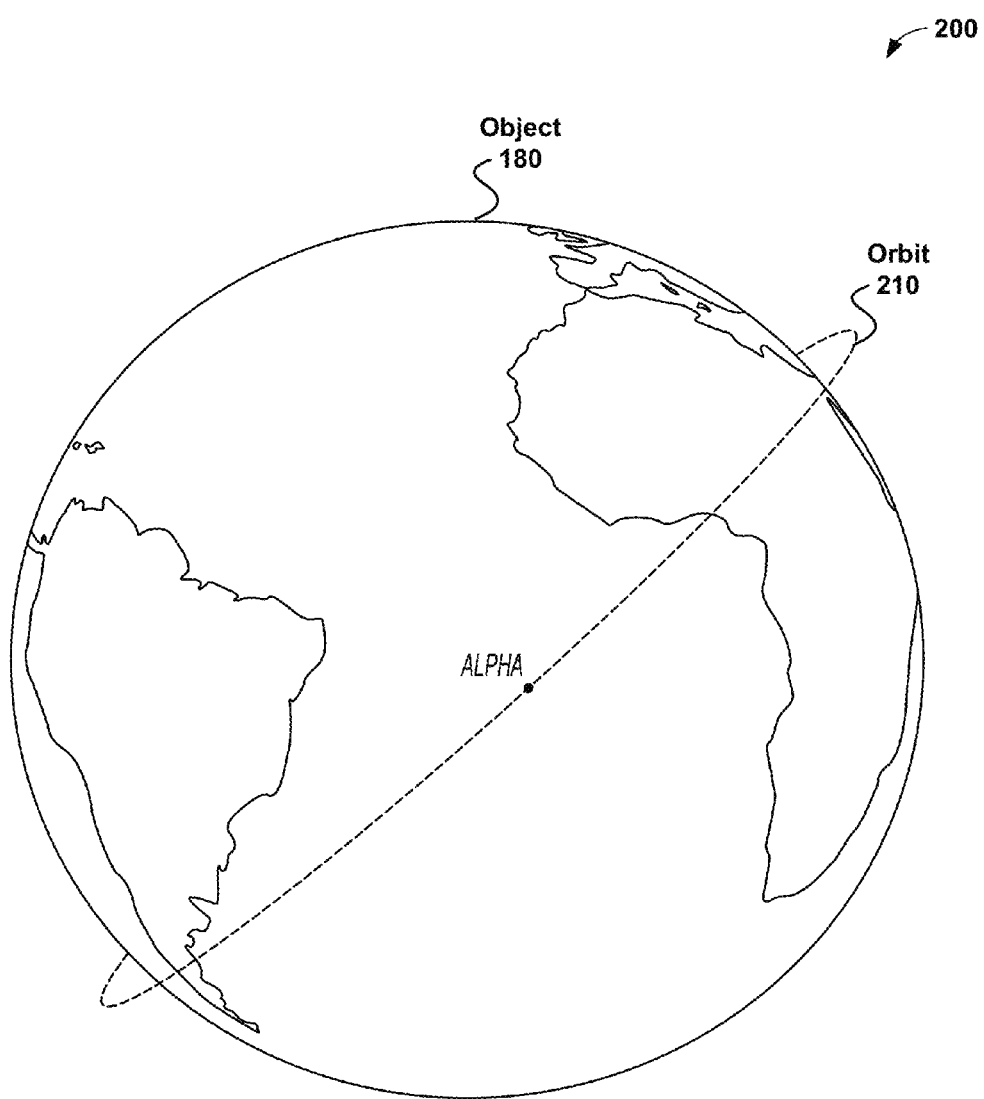
FIG. 2A shows an orbit of a first spacecraft around an object, in accordance with an example embodiment.

FIG. 2A shows orbit 210 of a first spacecraft ALPHA around object 180, in accordance with an example embodiment, where orbit 210 is shown using a dashed line. In scenario 200, a first spacecraft ALPHA is a satellite orbiting object 180/the Earth. Orbit 210 can be described using a plurality of orbital parameters; in scenario 200, these orbital parameters include semi-major axis $a_\alpha$, inclination $i_\alpha$, RAAN $\Omega_\alpha$, eccentricity $e_\alpha$, argument of perigee $w_\alpha$, and mean anomaly $M_\alpha$.

Figure 2B:
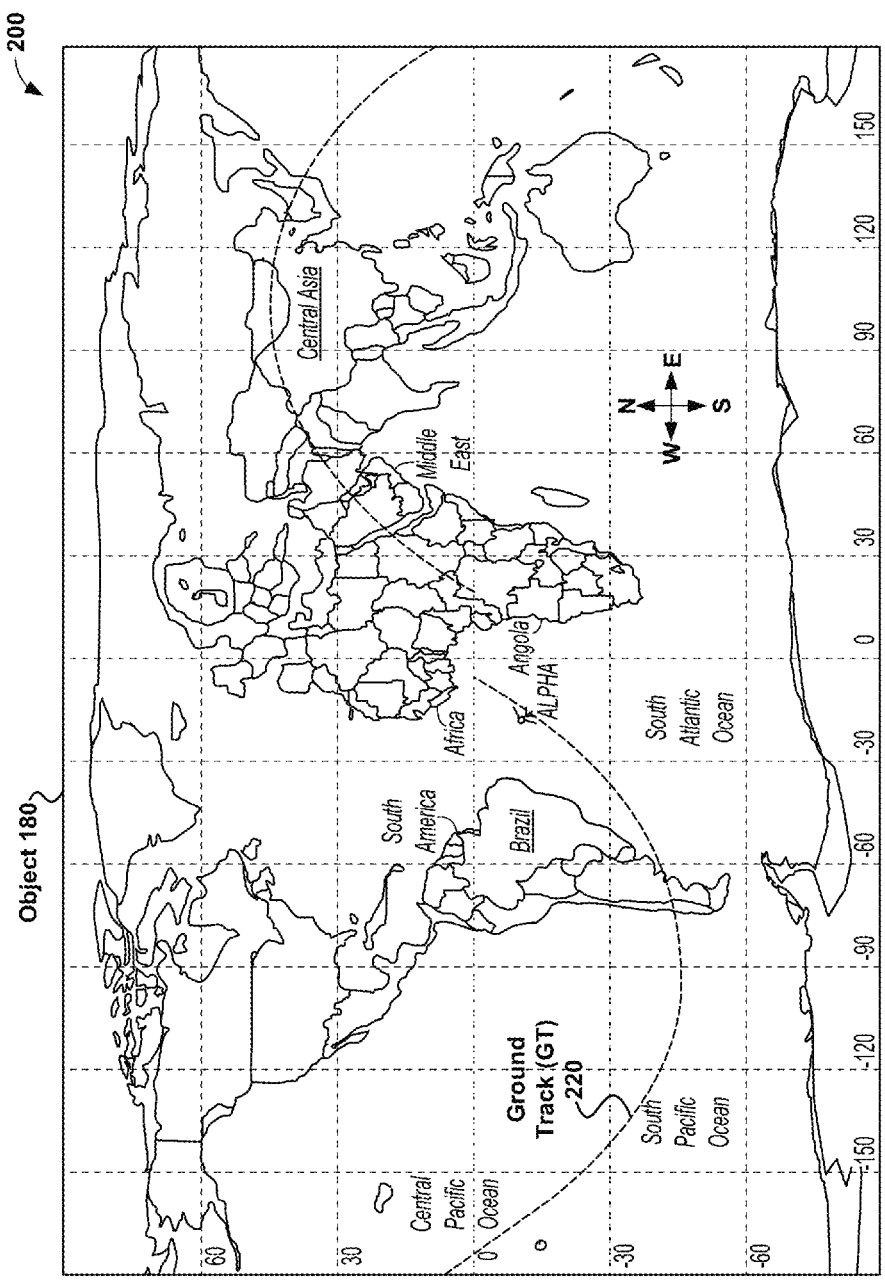
FIG. 2B shows a ground track of the first spacecraft, in accordance with an example embodiment.

FIG. 2B shows ground track (GT) 220 of first spacecraft ALPHA in accordance with an example embodiment, where ground track 220 is shown using a dashed line. Ground track 220 indicates that, as first spacecraft ALPHA orbits object 180/the Earth, first spacecraft ALPHA flies over a southern portion of South America, a southern portion of the Atlantic Ocean, a central portion of Africa, the Middle East and Central Asia, and central and southern portions of the Pacific Ocean. FIG. 2B also indicates that first spacecraft ALPHA is at a point in its orbit about object 180/the Earth corresponding to a point where ground track 220 indicates first spacecraft ALPHA is flying over the Atlantic Ocean to the east of Brazil and to the west of Angola.

Scenario 200 continues with a launch of second spacecraft BETA. Second spacecraft BETA is a satellite that will orbit object 180/the Earth after launch. The launch of second spacecraft BETA occurs at a particular instant at time (as opposed to being occurring during a launch window) during scenario 200. The orbit of second spacecraft BETA can be described using a plurality of orbital parameters; in scenario 200, the orbital parameters for the orbit of second spacecraft BETA include semi-major axis $a_\beta$, inclination $i_\beta$, RAAN $\Omega_\beta$, eccentricity $e_\beta$, argument of perigee $w_\beta$, and mean anomaly $M_\beta$.

Figure 2C:
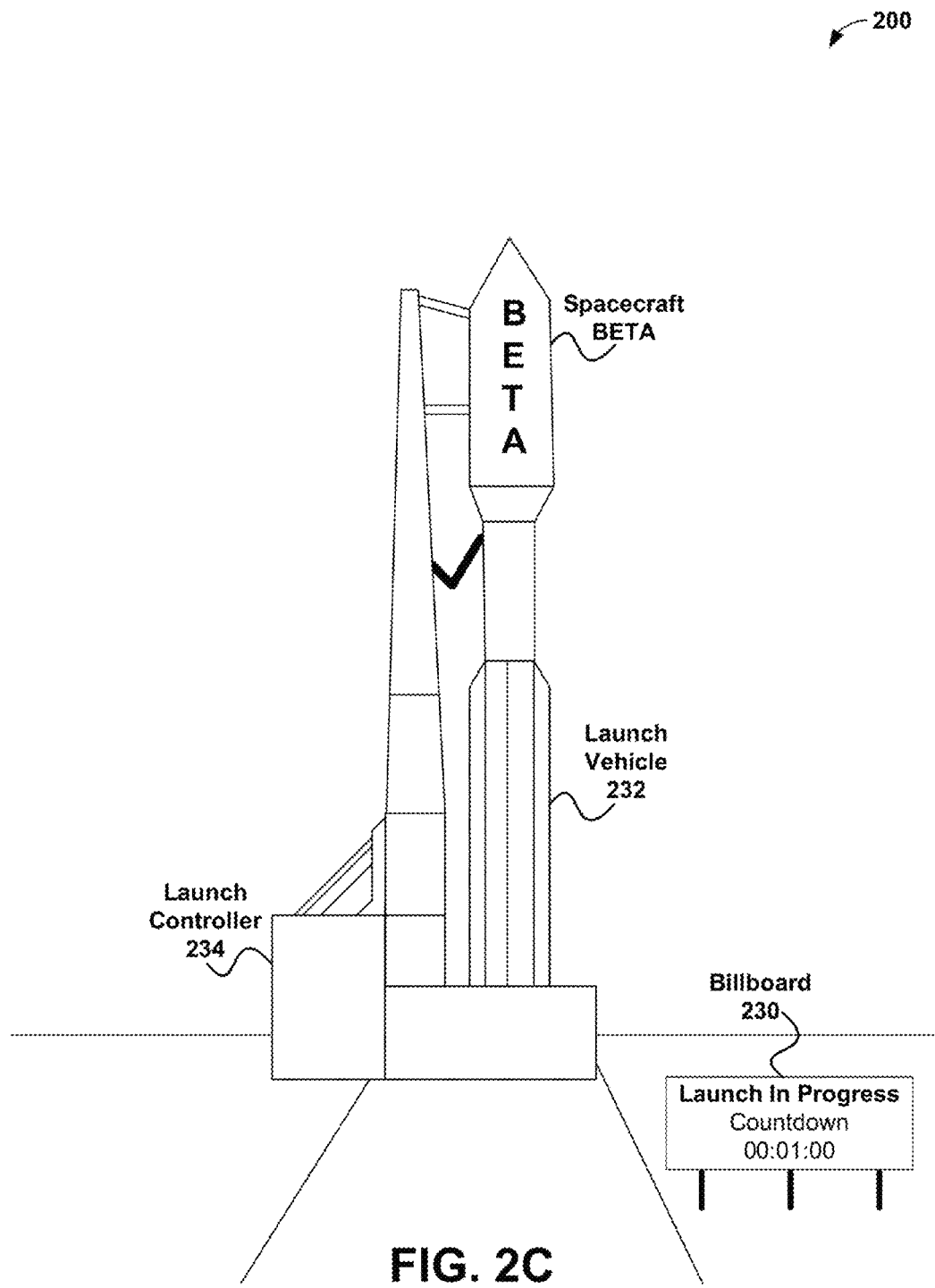
FIG. 2C shows an example launch of a second spacecraft, in accordance with an example embodiment.

FIG. 2C shows an example launch of spacecraft BETA in accordance with an example embodiment. Specifically, billboard 230 indicates that the launch of spacecraft BETA will occur in one minute as indicated by displayed time "00:01:00" for "Countdown". Spacecraft BETA will be launched into orbit of object 180/the Earth by launch vehicle 232 that is controlled by launch controller 234. In scenario 200, launch controller 234 is shown nearby launch vehicle 232; in other embodiments, launch controller 234 can be configured to communicate with launch vehicle 232 via wired and/or wireless communication links and so can be physically remote from launch vehicle 232.

Launch controller 234 can be, or include, a computing device. In particular, launch controller 234 can include one or more processors and data storage, such as discussed below in the context of computing device 320 of FIG. 3B. The data storage can store computer-readable program instructions, such as instructions 326 of computing device 320, that when executed by the processor(s) of launch controller 234, can cause launch controller 234 to perform functions. These functions include, but are not limited to, the herein-described functions related to method 102 discussed above in the context of FIG. 1A, and perhaps the herein-described functions related to method 150 discussed above in the context of FIG. 1B and/or algorithm A1.

Launch controller 234 can use the techniques of method 102 to determine the orbital parameters for second spacecraft BETA based on orbital parameters for first spacecraft ALPHA and a following time FT, and thus determine an orbit for second spacecraft BETA around object 180/the Earth.

Table 4 shows values of orbital parameters for first spacecraft ALPHA at launch time and following time FT provided as inputs to launch controller 234 in scenario 200.

TABLE 4

| Parameter | Input Value |
|---|---|
| $a_\alpha$, Semi-major axis for ALPHA's orbit | 7078.137 km |
| $i_\alpha$, Inclination for ALPHA's orbit | 45 degrees |
| $\Omega_\alpha$, RAAN for ALPHA's orbit | 0 degrees |
| $e_\alpha$, Eccentricity for ALPHA's orbit | 0 |
| $w_\alpha$, Argument of perigee for ALPHA's orbit | 0 degrees |
| $M_\alpha$, Mean anomaly for ALPHA | 0 degrees |
| FT | 600 seconds |

Then, launch controller 234 can use the techniques of method 102, including use of some or all of Equations (2)-(14), to determine the parameter values indicated in Table 5 which include orbital parameters for second spacecraft BETA.

TABLE 5

| Parameter | Source | Determined Value |
|---|---|---|
| $T_\alpha$, Orbital period ALPHA's orbit | Equation (2) | 5926.38 seconds |
| $n_\alpha$, Mean motion for ALPHA's orbit | Equation (3) | 0.0607454 degrees/second |
| $\dot{\Omega}$, Rate of change for the RAAN for ALPHA's orbit | Equation (4) | $-5.66393 \times 10^{-5}$ degrees/second |
| $\dot{w}$, Rate of change for the argument of perigee for ALPHA's orbit | Equation (5) | $6.00751 \times 10^{-5}$ degrees/second |
| $\dot{M}$, Linearized rate of change for the mean anomaly for ALPHA's orbit | Equation (6) | $2.0025 \times 10^{-5}$ degrees/second |
| $\dot{M}_0$, Rate of change for the mean anomaly for ALPHA's orbit | Equations (7) and (8) | 0.060765337 degrees/second |
| $M_\beta$, Mean anomaly for BETA | Equation (9) | 323.504 degrees |
| $\Omega_\beta$, RAAN for BETA's orbit | Equation (10) | 2.54083 degrees |
| $w_\beta$, Argument of perigee for BETA's orbit | Equation (11) | 0.360451 degrees |
| $a_\beta$, Semi-major axis for BETA's orbit | Equation (12) | 7078.137 km |
| $i_\beta$, Inclination for BETA's orbit | Equation (13) | 45 degrees |
| $e_\beta$, Eccentricity for BETA's orbit | Equation (14) | 0 |

Launch controller 234 can use the values of at least the plurality of orbital parameters for second spacecraft BETA shown in Table 5 above to launch second spacecraft BETA into orbit around object 180/the Earth. The plurality of orbital parameters for second spacecraft BETA include the values shown in Table 5 for mean anomaly $M_\beta$, RAAN $\Omega_\beta$, semi-major axis $a_\beta$, inclination $i_\beta$, eccentricity $e_\beta$, and argument of perigee $w_\beta$ shown in Table 5 above. After determining at least the plurality of orbital parameters for BETA shown in Table 5, launch controller 234 guides and/or controls launch vehicle 232 to launch second spacecraft BETA into orbit around object 180/the Earth, where the orbit of second spacecraft BETA is described by the plurality of orbital parameters for second spacecraft BETA. For example, launch controller 234 can generate and subsequently send, or otherwise provide, a command to launch vehicle 232 to launch the second spacecraft, where the command is based on the second plurality of orbital parameters.

For example, the command to launch second spacecraft BETA can be sent from launch controller 234 to launch vehicle 232 at a specific time $T_{LAUNCH}$, where $T_{LAUNCH}$ is determined based on the orbital parameters for the orbit of second spacecraft BETA. As another example, the command to launch second spacecraft BETA can indicate a direction of travel for the launch vehicle 232. As even another example, the command to launch second spacecraft BETA can indicate how long to fire and/or how much thrust to be provided by one or more engines of the launch vehicle 232. Other commands to launch the second spacecraft BETA are possible as well.

Scenario 200 continues with, after receiving the command to launch second spacecraft β, launch vehicle 232 launching second spacecraft BETA into the second orbit of object 180/the Earth. In scenario 200, launch vehicle 232 successfully launches with second spacecraft BETA being into orbit around object 180/the Earth, where the orbit of second spacecraft BETA is in accordance with the plurality of orbital parameters for second spacecraft BETA determined by launch controller 234.

Figure 2D:
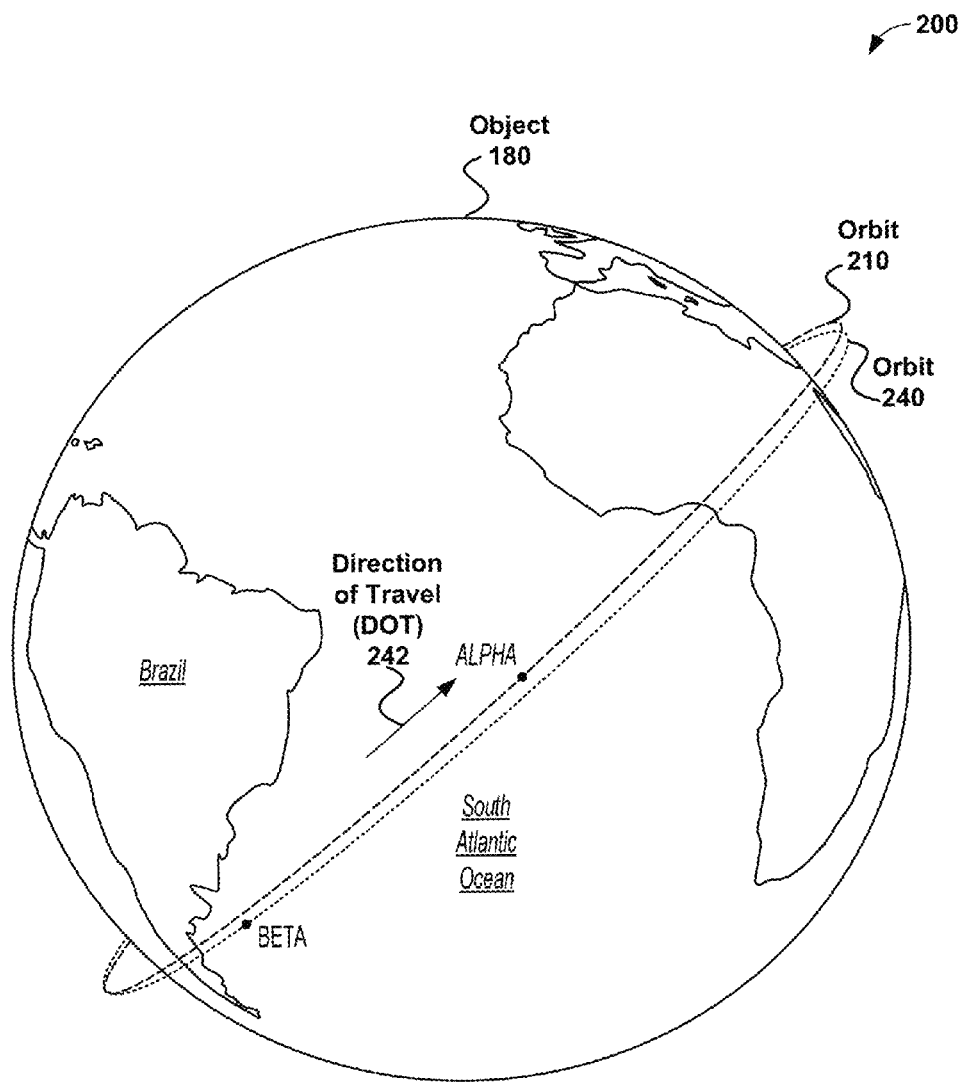
FIG. 2D shows orbits of the first and second spacecraft around the object, in accordance with an example embodiment.

FIG. 2D shows respective orbits 210, 240 of both spacecraft ALPHA and BETA around object 180/the Earth, in accordance with an example embodiment. In FIG. 2D, orbit 210 for first spacecraft ALPHA is shown using a dashed line and orbit 240 for second spacecraft BETA is shown using a dotted line. As mentioned above, orbit 210 for first spacecraft ALPHA can be described using a plurality of orbital parameters that include semi-major axis $a_\alpha$, inclination $i_\alpha$, RAAN $\Omega_\alpha$, eccentricity $e_\alpha$, argument of perigee $w_\alpha$, and mean anomaly $M_\alpha$, whose values for scenario 200 are shown in Table 4. That is, orbit 210 is the same in both FIGS. 2A and 2D.

Orbit 240 for second spacecraft BETA can be described using a plurality of orbital parameters; which as indicated above, include semi-major axis $a_\beta$, inclination $i_\beta$, RAAN $\Omega_\beta$, eccentricity $e_\beta$, argument of perigee $w_\beta$, and mean anomaly $M_\beta$, whose values in scenario 200 are shown in Table 5. That is, orbit 240 for second spacecraft BETA is the orbit that launch controller 234 determined for spacecraft BETA to orbit object 180/the Earth. FIG. 2D indicates both spacecraft ALPHA and BETA are orbiting object 180/the Earth, while second spacecraft BETA is behind, or follows, first spacecraft ALPHA along direction of travel (DOT) 242.

Figure 2E:
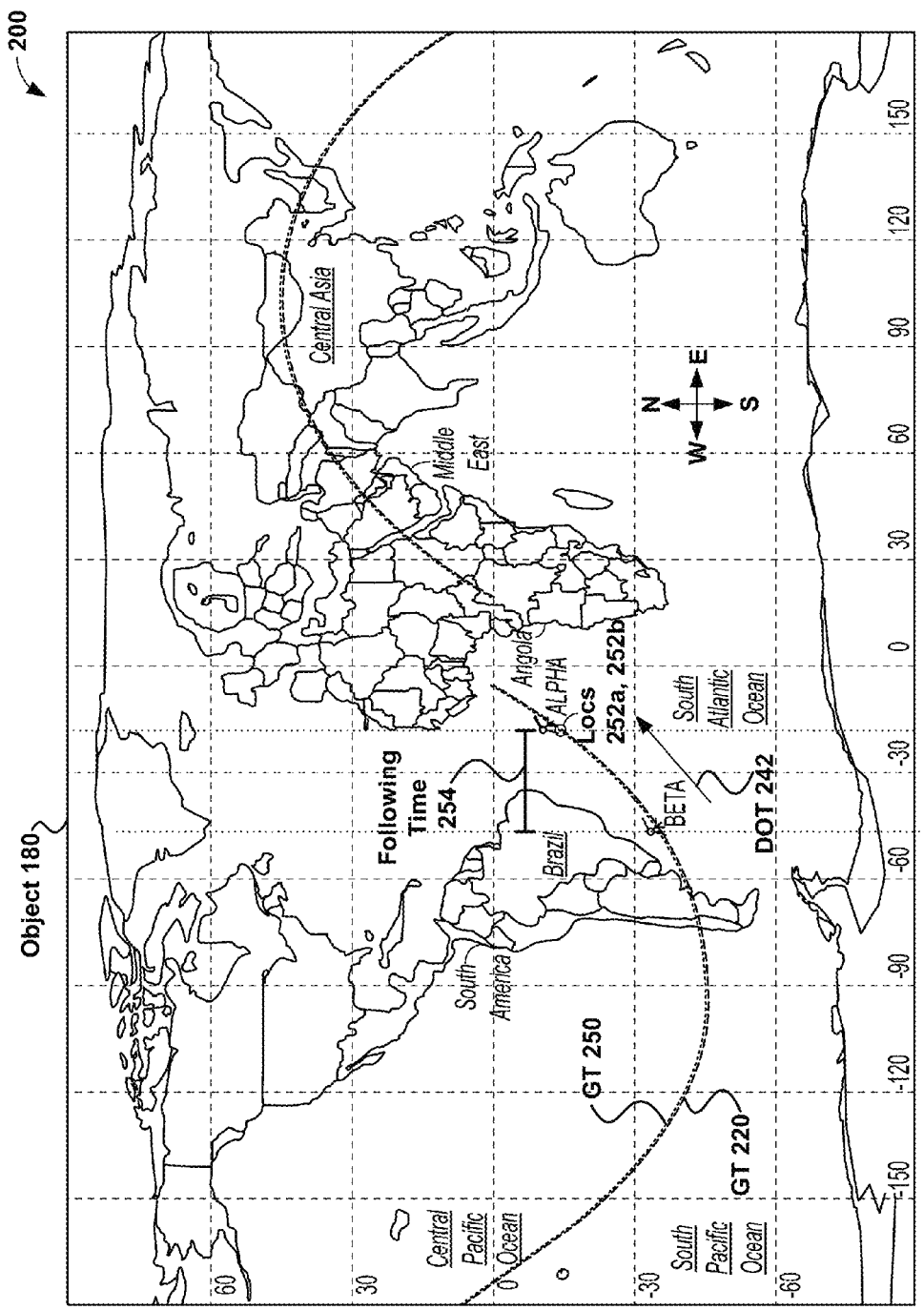
FIG. 2E shows ground tracks of the first and second spacecraft, in accordance with an example embodiment.

FIG. 2E shows ground track 220 of first spacecraft ALPHA and ground track 250 of second spacecraft BETA, in accordance with an example embodiment, where ground track 220 is shown using a dashed line and ground track 250 is shown using a dotted line. Ground track 220 is the same in both FIGS. 2B and 2E. Ground track 250 indicates that, as also shown in FIG. 2B, second spacecraft BETA orbits object 180/the Earth, first spacecraft ALPHA flies over a southern portion of South America, a southern portion of the Atlantic Ocean, a central portion of Africa, the Middle East and Central Asia, and central and southern portions of the Pacific Ocean. Ground track 250 of second spacecraft BETA closely approximates ground track 220—both ground tracks 220, 250 indicate that both spacecraft ALPHA and BETA over the same portions of object 180/the Earth. Thus, one or more tracking stations located on object 180/the Earth used to track spacecraft ALPHA can also track spacecraft BETA.

FIG. 2E shows first spacecraft ALPHA is at a point 252a along ground track 220 over object 180/the Earth corresponding to a point over the Atlantic Ocean to the east of Brazil and to the west of Angola and that second spacecraft BETA is at a point along ground track 250 over the Atlantic Ocean near the southern Atlantic coast of Brazil. FIG. 2E also indicates that second spacecraft BETA follows first spacecraft ALPHA by following time 254, which in scenario 200 is approximately 600 seconds along direction of travel 242. Table 4 indicates that 600 seconds is the value of following time FT parameter provided as an input to launch controller 234, before launch controller 234 controlled the launch of second spacecraft BETA. Then, after time FT elapses, second spacecraft BETA will arrive at point 252b along ground track 250 over object 180/the Earth, and that that second spacecraft BETA, where point 252b is a point over the Atlantic Ocean to the east of Brazil and to the west of Angola.

Thus, second spacecraft BETA can be determined to have been successfully launched by orbital vehicle 232 and launch controller 234 into an orbit about object 180/the Earth such that second spacecraft BETA using at least the following two criteria: (1) has a virtually identical ground track 250 to the ground track 220 of first spacecraft ALPHA and (2) follows the orbit and consequently the ground track of first spacecraft ALPHA by the following time (e.g., 600 seconds) indicated prior to launch of second spacecraft BETA. After the launch of second spacecraft BETA is determined to be a successful launch, scenario 200 can be completed.

Example Computing Network

Figure 3A:
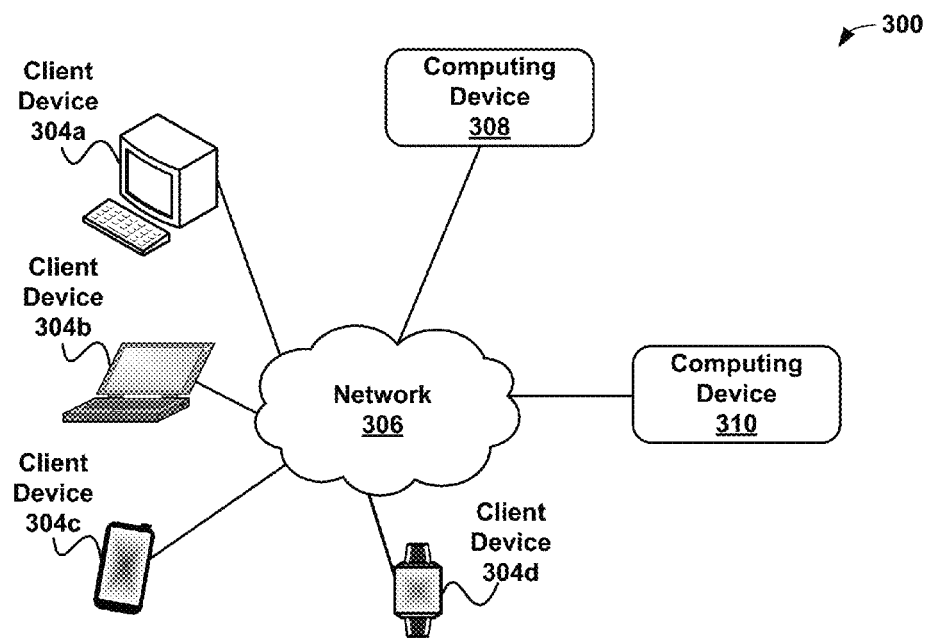
FIG. 3A depicts a computer network, in accordance with an example embodiment.

FIG. 3A depicts computer network 300, in accordance with an example embodiment. In FIG. 3A, computing devices 308 and 310 are configured to communicate, via network 306, with client devices 304a, 304b, 304c, 304d. As shown in FIG. 3A, client devices can include personal computer 304a, laptop computer 304b, smart phone 304c, and smart watch 304d. More generally, client devices 304a-304d (or any additional client devices) can be any sort of computing device, such as a workstation, network terminal, desktop computer, laptop computer, mobile computing device, wireless communication device (e.g., cell phone, smart phone, smart watch), and so on.

Network 306 can correspond to a local area network, a wide area network, a corporate intranet, the public Internet, combinations thereof, or any other type of network(s) configured to provide communication between networked computing devices. Computing devices 308 and 310 can share content and/or provide content to client devices 304a-304d and each other via network 306; i.e., act as content servers, share orbital parameters and/or other data. As shown in FIG. 3A, computing devices 308 and 310 are not physically at the same location; for example, one or more of computing devices 308 and 310 can be in a remote location. Alternatively, computing devices 308 and 310 can be co-located, and/or can be accessible via a network separate from network 306. Although FIG. 3A shows three client devices and two computing devices, network 306 can service more or fewer than three client devices and/or more or fewer than two computing devices.

Example Computing Device

Figure 3B:
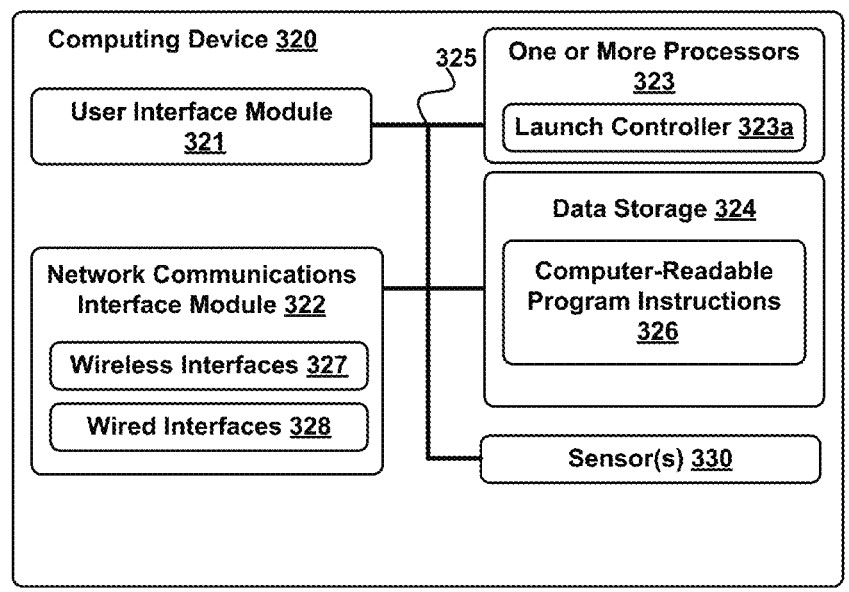
FIG. 3B is a block diagram of a computing device, in accordance with an example embodiment.

FIG. 3B is a block diagram of computing device 320, which can include user interface module 321, network-communication interface module 322, one or more processors 323, data storage 324, and sensor(s) 330, all of which may be linked together via a system bus, network, or other connection mechanism 325, in accordance with an example embodiment. In particular, computing device 320 can be configured to perform one or more functions related to one or more of: computing devices 100, 100a, herein-described spacecraft, herein-described launch controllers, scenario 200, method 102, algorithm A1, method 150, and method 400. In some embodiments, computing device 320 can be embodied as one or more of: desktop computer, laptop or notebook computer, personal data assistant (PDA), mobile phone, smart phone, smart watch, embedded processor, and/or any similar device that is equipped with at least one processing unit capable of executing machine-language instructions that implement at least part of the herein-described techniques and methods, including but not limited to method 102 discussed above in the context of FIG. 1A, method 150 discussed above in the context of FIG. 1B, algorithm A1, and/or method 400 described in more detail below with respect to FIG. 4.

User interface 321 can receive input and/or provide output, perhaps to a user. User interface 321 can be configured to send and/or receive data to and/or from user input from input device(s), such as a keyboard, a keypad, a touch screen, a touch pad, a computer mouse, a track ball, a joystick, a game controller, and/or other similar devices configured to receive user input from a user of the computing device 320. User interface 321 can include output display devices, which can include, but are not limited to, one or more: cathode ray tubes (CRTs), liquid crystal displays (LCDs), light emitting diodes (LEDs), displays using digital light processing (DLP) technology, printers, light bulbs, and/or other devices capable of displaying visual outputs (e.g., graphical, textual, and/or numerical information). User interface module 321 can also be configured with one or more devices to generate audible output(s), such as a speaker, speaker jack, audio output port, audio output device, earphones, and/or other similar devices configured to convey sound and/or audible information to a user of computing device 320.

Network-communication interface module 322 can be configured to send and receive data over wireless interfaces 327 and/or wired interfaces 328 via a network, such as network 306. Wireless interface(s) 327 if present, can utilize an air interface, such as a Bluetooth®, ZigBee®, Wi-Fi, and/or WiMAX interface to a data network, such as a WAN, a LAN, one or more public data networks (e.g., the Internet), one or more private data networks, or any combination of public and private data networks. Wired interface(s) 328, if present, can comprise a wire, cable, fiber-optic link and/or similar physical connection to a data network, such as a wide area network (WAN), a local area network (LAN), one or more public data networks, such as the Internet, one or more private data networks, or any combination of such networks.

In some embodiments, network-communication interface module 322 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well as or in addition to those listed herein to secure (and then decrypt/decode) communications.

Processor(s) 323 can include one or more central processing units, computer processors, mobile processors, digital signal processors (DSPs), GPUs, microprocessors, computer chips, programmable processors, multi-core processors, and/or other processing units configured to execute machine-language instructions and process data. Processor(s) 323 can be configured to execute computer-readable program instructions 326 that are contained in data storage 324 and/or other instructions as described herein. In some embodiments, processor(s) 323 can include safety controller 323a, which can include one or more processors utilizing hardware and/or software resources (e.g., executing some or all of computer-readable program instructions 326) to perform the herein-described functionality of one or more of a computing device, a spacecraft, a launch vehicle, a billboard, and a launch controller.

Data storage 324 can include one or more physical and/or non-transitory storage devices, such as read-only memory (ROM), random access memory (RAM), removable disk drives, hard drives, thumb drives, magnetic-tape memory, optical-disk memory, flash memory, volatile storage devices, non-volatile storage devices, and/or other storage devices. Generally, a storage device is hardware that is capable of storing information; for example, data, computer-readable program instructions, and/or other suitable information on a temporary basis and/or a permanent basis. Data storage 324 can include one or more physical and/or non-transitory storage devices with at least enough combined storage capacity to contain computer-readable program instructions 326 and any associated/related data structures. In some embodiments, some or all of data storage 324 can be removable, such as a removable hard drive, removable disk, or flash memory.

Figure 4:
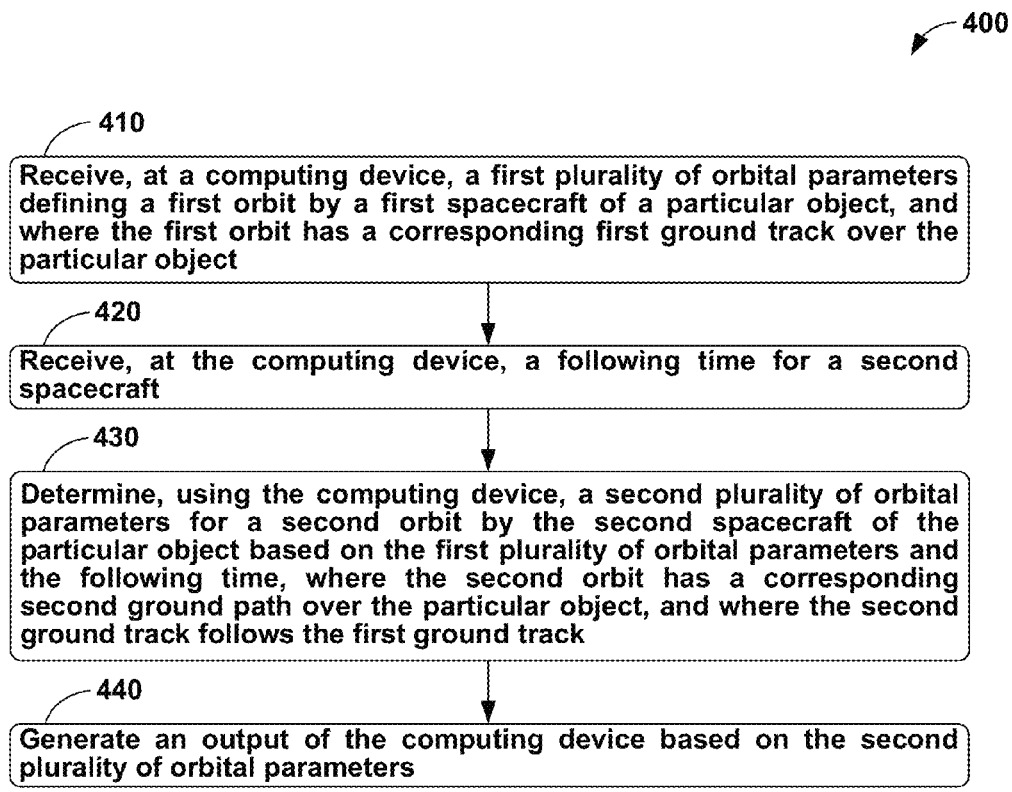
FIG. 4 is a flowchart of a method, in accordance with an example embodiment.

Computer-readable program instructions 326 and any data structures contained in data storage 324 include computer-readable program instructions executable by processor(s) 323 and any storage required, respectively, to perform at least part of herein-described scenarios and methods, including but not limited to method 102 described above in the context of FIG. 1A, algorithm A1, method 150 described above in the context of FIG. 1B, scenario 200 described above with respect to FIGS. 2A-2E, and method 400 described below in the context of FIG. 4. Computer-readable program instructions 326 can include instructions that when executed by processor(s) 323 to perform functions, including but not limited to herein-described functionality of software, displays, and/or user interfaces.

In some embodiments, computing device 320 can include one or more sensors 330. Sensor(s) 330 can be configured to measure conditions in an environment around computing device 320 and provide data about the measured conditions of the environment. The data can include, but are not limited to, location data about computing device 320 (including, but not limited to, latitude, longitude, and/or altitude data), other kinematic information related to computing device 320 (e.g., speed, velocity, acceleration data), and other data about the environment around computing device 320, meteorological data about the environment (e.g., air temperature, humidity, barometric pressure, wind speed), and electromagnetic radiation data (e.g., infra-red, ultra-violet, X-ray data). The one or more sensors 330, can include, but are not limited to, one or more: Global Positioning System (GPS) sensors, location sensors, gyroscopes, accelerometers, magnetometers, video and/or still cameras, light sensors, infrared sensors, ultraviolet sensors, X-ray sensors, meteorological sensors, proximity sensors, vibration and/or motion sensors, heat sensors, thermometers, lasers, and microphones. Other examples of sensor(s) 330 are possible as well.

Other components shown in FIG. 3B can be varied from the illustrative examples shown. Generally, the different embodiments can be implemented using any hardware device or system capable of running program code.

Operational Methods

FIG. 4 is a flowchart of a method 400, in accordance with an example embodiment. Method 400 can be carried out by a computing device, such as computing device 320. The computing device can include one or more processors and data storage, such as discussed above at least in the context of computing device 320 of FIG. 3B. The data storage can store computer-readable program instructions, such as instructions 326 of computing device 320, that when executed by the processor(s) of the computing device, can cause the computing to perform functions. These functions include, but are not limited to, the herein-described functions related to method 400 indicated by FIG. 4.

Method 400 can begin at block 410, where a computing device can receive a first plurality of orbital parameters defining a first orbit by a first spacecraft of a particular object, where the first orbit has a corresponding first ground track over the particular object, such as discussed above at least in the context of FIGS. 1A, 1B, and 2C.

At block 420, the computing device can receive a following time for a second spacecraft, such as discussed above at least in the context of FIGS. 1A, 1B, and 2C. In some embodiments, the techniques of blocks 410 and 420 can be combined; e.g., the computing device can receive both the first plurality of orbital parameters and the following time at once.

At block 430, the computing device can determine a second plurality of orbital parameters for a second orbit by the second spacecraft of the particular object based on the first plurality of orbital parameters and the following time, where the second orbit has a corresponding second ground track over the particular object, and where the second ground track follows the first ground track, such as discussed above in the context of FIGS. 1A, 1B, and 2C.

In some embodiments, determining the second plurality of orbital parameters for the second orbit can include determining the second plurality of orbital parameters for the second orbit so that: when the first spacecraft reaches a first particular point on the first ground track at a first time, then the second spacecraft reaches a second particular point on the second ground track at a second time, where the second particular point corresponds to the first particular point, and where the second time is based on the first time and the following time, such as discussed above at least in the context of FIGS. 1A and 2C.

In other embodiments, the first plurality of orbital parameters can include a first mean anomaly parameter and the second plurality of orbital parameters can include a second mean anomaly parameter. In these embodiments, determining the second plurality of orbital parameters can include determining a rate of change of a mean anomaly; and determining the second mean anomaly parameter based on the first mean anomaly parameter, the rate of change of the mean anomaly, and the following time for the second spacecraft, such as discussed above at least in the context of FIG. 1A.

In still other embodiments, the first plurality of orbital parameters can include a first RAAN parameter and the second plurality of orbital parameters can include a second RAAN parameter. In these embodiments, determining the second plurality of orbital parameters can include determining a rate of change of a RAAN; and determining the second RAAN parameter based on the first RAAN parameter, the rate of change of the RAAN, and the following time for the second spacecraft, such as discussed above at least in the context of FIG. 1A. In particular of these embodiments, the first plurality of orbital parameters can include a parameter related to a semi-major axis of the first orbit and a parameter related to an inclination of the first orbit. In these particular embodiments, determining the rate of change of the RAAN can include determining a mean motion parameter based on the parameter related to a semi-major axis of the first orbit; and determining the rate of change of the RAAN based on the mean motion parameter, and the parameter related to an inclination of the first orbit, such as discussed above at least in the context of FIG. 1A.

In even other embodiments, the launch of the second spacecraft can occur within a launch window between a first launch time and a second launch time, where the second launch time is later than the first launch time. Then, in these even other embodiments, determining the second plurality of orbital parameters for the second orbit by the second spacecraft of the particular object can include: determining a first estimate of the second plurality of orbital parameters for the second orbit by the second spacecraft of the particular object when the second spacecraft is launched at the first launch time; and determining a second estimate of the second plurality of orbital parameters for a second orbit by the second spacecraft of the particular object when the second spacecraft is launched at the second launch time, such as discussed above at least in the context of FIG. 1B.

At block 440, the computing device can generate an output that is based on the second plurality of orbital parameters, such as discussed above in the context of FIGS. 1A, 1B, and 2C. For example, the output can include the second plurality of orbital parameters.

In some embodiments, the output of the computing device based on the second plurality of orbital parameters can include a command to launch the second spacecraft, such as discussed above at least in the context of FIGS. 1A and 2C. In particular embodiments, method 400 can further include: after receiving the command to launch the second spacecraft, launching the second spacecraft into the second orbit of the particular object, such as discussed above at least in the context of FIG. 2C.

Disclosed embodiments are described above with reference to the accompanying drawings, in which some, but not all of the disclosed embodiments may be shown. Indeed, several different embodiments may be described and should not be construed as limited to the embodiments set forth herein. Rather, these embodiments are described so that this disclosure are thorough and complete and convey the disclosure at least to those skilled in the art.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

It should be understood that for the processes and methods disclosed herein, flowcharts show functionality and operation of possible implementations of respective embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in the disclosed flowcharts may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method, comprising:
   receiving, at a computing device, a first plurality of orbital parameters defining a first orbit by a first spacecraft of a particular object, wherein the first orbit has a corresponding first ground track over the particular object;
   receiving, at the computing device, a following time for a second spacecraft;

determining, using the computing device, a second plurality of orbital parameters for a second orbit by the second spacecraft of the particular object based on the first plurality of orbital parameters and the following time, wherein the second orbit has a corresponding second ground track over the particular object, and wherein the second ground track follows the first ground track;

generating an output of the computing device that is based on the second plurality of orbital parameters, wherein the output of the computing device comprises a command to launch the second spacecraft; and after receiving the command to launch the second spacecraft, launching the second spacecraft into the second orbit of the particular object.

2. The method of claim 1, wherein the output of the computing device that is based on the second plurality of orbital parameters further comprises one or more images indicating an orbit of the second spacecraft.

3. The method of claim 1, wherein the first ground track and the second ground track are within a threshold distance of each other.

4. The method of claim 1, wherein the launch of the second spacecraft occurs within a launch window between a first launch time and a second launch time wherein the second launch time is later than the first launch time, and wherein determining the second plurality of orbital parameters for the second orbit by the second spacecraft of the particular object comprises:

determining a first estimate of the second plurality of orbital parameters when the second spacecraft is launched at the first launch time; and determining a second estimate of the second plurality of orbital parameters for a second orbit by the second spacecraft of the particular object when the second spacecraft is launched at the second launch time.

5. The method of claim 1, wherein determining the second plurality of orbital parameters for the second orbit comprises determining the second plurality of orbital parameters for the second orbit so that:

when the first spacecraft reaches a first particular point on the first ground track at a first time, then the second spacecraft reaches a second particular point on the second ground track at a second time, wherein the second particular point corresponds to the first particular point, and wherein the second time is based on the first time and the following time.

6. The method of claim 1, wherein the first plurality of orbital parameters comprises a first mean anomaly parameter, wherein the second plurality of orbital parameters comprises a second mean anomaly parameter, and wherein determining the second plurality of orbital parameters comprises:

determining a rate of change of a mean anomaly; and determining the second mean anomaly parameter based on the first mean anomaly parameter, the rate of change of the mean anomaly, and the following time for the second spacecraft.

7. The method of claim 1, wherein the first plurality of orbital parameters comprises a first right ascension of the ascending (RAAN) parameter, wherein the second plurality of orbital parameters comprises a second RAAN parameter, and wherein determining the second plurality of orbital parameters comprises:

determining a rate of change of a RAAN; and determining the second RAAN parameter based on the first RAAN parameter, the rate of change of the RAAN, and the following time for the second spacecraft.

8. The method of claim 7, wherein the first plurality of orbital parameters comprises a parameter related to a semi-major axis of the first orbit and a parameter related to an inclination of the first orbit, and wherein determining the rate of change of the RAAN comprises:

determining a mean motion parameter based on the parameter related to the semi-major axis of the first orbit; and determining the rate of change of the RAAN based on the mean motion parameter, and the parameter related to an inclination of the first orbit.

9. An article of manufacture, comprising a non-transitory computer-readable storage medium storing instructions that, upon execution by a processor of the article of manufacture, cause the article of manufacture to perform functions comprising:

receiving a first plurality of orbital parameters defining a first orbit by a first spacecraft of a particular object, wherein the first orbit has a corresponding first ground track over the particular object;

receiving a following time for a second spacecraft;

determining a second plurality of orbital parameters for a second orbit by the second spacecraft of the particular object based on the first plurality of orbital parameters and the following time, wherein the second orbit has a corresponding second ground track over the particular object, and wherein the second ground track follows the first ground track;

generating an output that is based on the second plurality of orbital parameters, wherein the output comprises a command to launch the second spacecraft; and after receiving the command to launch the second spacecraft, launching the second spacecraft into the second orbit of the particular object.

10. The article of manufacture of claim 9, wherein the output that is based on the second plurality of orbital parameters further comprises one or more images indicating an orbit of the second spacecraft.

11. The article of manufacture of claim 9, wherein determining the second plurality of orbital parameters comprises determining the second plurality of orbital parameters for the second orbit so that:

when the first spacecraft reaches a first particular point on the first ground track at a first time, then the second spacecraft reaches a second particular point on the second ground track at a second time, wherein the second particular point corresponds to the first particular point, and wherein the second time is based on the first time and the following time.

12. The article of manufacture of claim 9, wherein the first plurality of orbital parameters comprises a first mean anomaly parameter, wherein the second plurality of orbital parameters comprises a second mean anomaly parameter, and wherein determining the second plurality of orbital parameters comprises:

determining a rate of change of a mean anomaly; and determining the second mean anomaly parameter based on the first mean anomaly parameter, the rate of change of the mean anomaly, and the following time for the second spacecraft.

13. The article of manufacture of claim 9, wherein the first plurality of orbital parameters comprises a first right ascension of the ascending node (RAAN) parameter, wherein the second plurality of orbital parameters comprises a second RAAN parameter, and wherein determining the second plurality of orbital parameters comprises:

determining a rate of change of a RAAN; and determining the second RAAN parameter based on the first RAAN parameter, the rate of change of the RAAN, and the following time for the second spacecraft.

14. A computing device, comprising:

a processor for executing instructions as a computing device; and data storage, storing instructions that, upon execution by the processor, cause the computing device to perform functions comprising:

receiving a first plurality of orbital parameters defining a first orbit by a first spacecraft of a particular object, wherein the first orbit has a corresponding first ground track over the particular object;

receiving a following time for a second spacecraft;

determining a second plurality of orbital parameters for a second orbit by the second spacecraft of the particular object based on the first plurality of orbital parameters and the following time, wherein the second orbit has a corresponding second ground track over the particular object, and wherein the second ground track follows the first ground track;

generating an output that is based on the second plurality of orbital parameters, wherein the output comprises a command to launch the second spacecraft; and after receiving the command to launch the second spacecraft, launching the second spacecraft into the second orbit of the particular object.

15. The computing device of claim 14, wherein the output that is based on the second plurality of orbital parameters further comprises one or more images indicating an orbit of the second spacecraft.

16. The computing device of claim 14, wherein the launch of the second spacecraft occurs within a launch window between a first launch time and a second launch time, wherein the second launch time is later than the first launch time, and wherein determining the second plurality of orbital parameters for the second orbit by the second spacecraft of the particular object comprises:

determining a first estimate of the second plurality of orbital parameters for a second orbit by the second spacecraft of the particular object when the second spacecraft is launched at the first launch time; and determining a second estimate of the second plurality of orbital parameters for a second orbit by the second spacecraft of the particular object when the second spacecraft is launched at the second launch time.

17. The computing device of claim 14, wherein determining the second plurality of orbital parameters comprises determining the second plurality of orbital parameters for the second orbit so that:

when the first spacecraft reaches a first particular point on the first ground track at a first time, then the second spacecraft reaches a second particular point on the second ground track at a second time, wherein the second particular point corresponds to the first particular point, and wherein the second time is based on the first time and the following time.

18. The computing device of claim 14, wherein the first plurality of orbital parameters comprises a first mean anomaly parameter, wherein the second plurality of orbital parameters comprises a second mean anomaly parameter, and wherein determining the second plurality of orbital parameters comprises:

determining a rate of change of a mean anomaly; and determining the second mean anomaly parameter based on the first mean anomaly parameter, the rate of change of the mean anomaly, and the following time for the second spacecraft.

19. The computing device of claim 14, wherein the first plurality of orbital parameters comprises a first right ascension of the ascending node (RAAN) parameter, wherein the second plurality of orbital parameters comprises a second RAAN parameter, and wherein determining the second plurality of orbital parameters comprises:

determining a rate of change of a RAAN; and determining the second RAAN parameter based on the first RAAN parameter, the rate of change of the RAAN, and the following time for the second spacecraft.

20. The computing device of claim 19, wherein the first plurality of orbital parameters comprises a parameter related to a semi-major axis of the first orbit and a parameter related to an inclination of the first orbit, and wherein determining the rate of change of the RAAN comprises:

determining a mean motion parameter based on the parameter related to the semi-major axis of the first orbit; and determining the rate of change of the RAAN based on the mean motion parameter, and the parameter related to an inclination of the first orbit.

\* \* \* \* \*